United States Patent
Wilmot

(10) Patent No.: US 11,367,279 B1
(45) Date of Patent: Jun. 21, 2022

(54) SENSORS, SOD HARVESTER WITH THE SENSORS AND METHODS FOR STEERING OR GUIDING SOD HARVESTERS

(71) Applicant: David R. Wilmot, Clarksburg, MD (US)

(72) Inventor: David R. Wilmot, Clarksburg, MD (US)

(*) Notice: Subject to any disclaimer, the term of this patent is extended or adjusted under 35 U.S.C. 154(b) by 162 days.

(21) Appl. No.: 16/851,950

(22) Filed: Apr. 17, 2020

Related U.S. Application Data

(60) Provisional application No. 62/961,814, filed on Jan. 16, 2020, provisional application No. 62/910,034, filed on Oct. 3, 2019, provisional application No. 62/836,172, filed on Apr. 19, 2019.

(51) Int. Cl.
| | |
|---|---|
| *G06V 20/10* | (2022.01) |
| *A01G 20/12* | (2018.01) |
| *G06T 3/40* | (2006.01) |
| *A01B 79/00* | (2006.01) |
| *G06V 10/75* | (2022.01) |
| *G06V 20/56* | (2022.01) |

(52) U.S. Cl.
CPC .......... *G06V 20/188* (2022.01); *A01B 79/005* (2013.01); *A01G 20/12* (2018.02); *G06T 3/4053* (2013.01); *G06V 10/751* (2022.01); *G06V 20/56* (2022.01)

(58) Field of Classification Search
CPC ........ A01G 20/10; A01G 20/15; A01G 20/12; A01B 79/005; G06K 9/00791; G06K 9/6202; G06K 9/00657; G06T 3/4053
See application file for complete search history.

(56) References Cited

U.S. PATENT DOCUMENTS

| | | | | |
|---|---|---|---|---|
| 4,868,752 | A * | 9/1989 | Fujii | G05D 1/0246 701/28 |
| 7,835,832 | B2 * | 11/2010 | Macdonald | A01B 79/005 701/24 |
| 8,393,137 | B1 * | 3/2013 | Crosby | A01D 41/127 56/341 |
| 8,452,053 | B2 * | 5/2013 | Zhang | G06V 10/757 382/104 |
| 10,299,443 | B1 * | 5/2019 | Tvetene | A01G 20/12 |
| 2004/0264762 | A1 * | 12/2004 | Mas | G06K 9/00664 382/154 |
| 2010/0252286 | A1 * | 10/2010 | Brouwer | A01G 20/15 172/19 |
| 2013/0306336 | A1 * | 11/2013 | Shattuck | A01G 20/15 172/19 |
| 2014/0131057 | A1 * | 5/2014 | Stefanski | A01G 20/15 172/1 |
| 2015/0021426 | A1 * | 1/2015 | Sammut | A01G 20/12 242/534.2 |

(Continued)

*Primary Examiner* — Ian L Lemieux
(74) *Attorney, Agent, or Firm* — Berenato & White, LLC

(57) ABSTRACT

The present invention relates to a system for steering or guiding a sod harvesting machine (sod harvester) with a high degree of precision, without the need for the sod harvesting machine to have a guide stick or shoe in physical or mechanical contact with the sod to be harvested or to be in connection with remote navigation systems, such as GPS. The system includes a sensor mounted at the front of the harvester and a processor for processing information from the sensor to determine a boundary line and for steering the sod harvester along the boundary line.

21 Claims, 19 Drawing Sheets

(56) References Cited

U.S. PATENT DOCUMENTS

| | | | |
|---|---|---|---|
| 2015/0245555 A1* | 9/2015 | Sammut | A01B 76/00 |
| | | | 172/1 |
| 2017/0055433 A1* | 3/2017 | Jamison | A01C 21/005 |
| 2017/0181369 A1* | 6/2017 | Sammut | A01B 76/00 |
| 2019/0128690 A1* | 5/2019 | Madsen | B60W 10/20 |
| 2019/0265044 A1* | 8/2019 | Keene | G01C 21/10 |

* cited by examiner

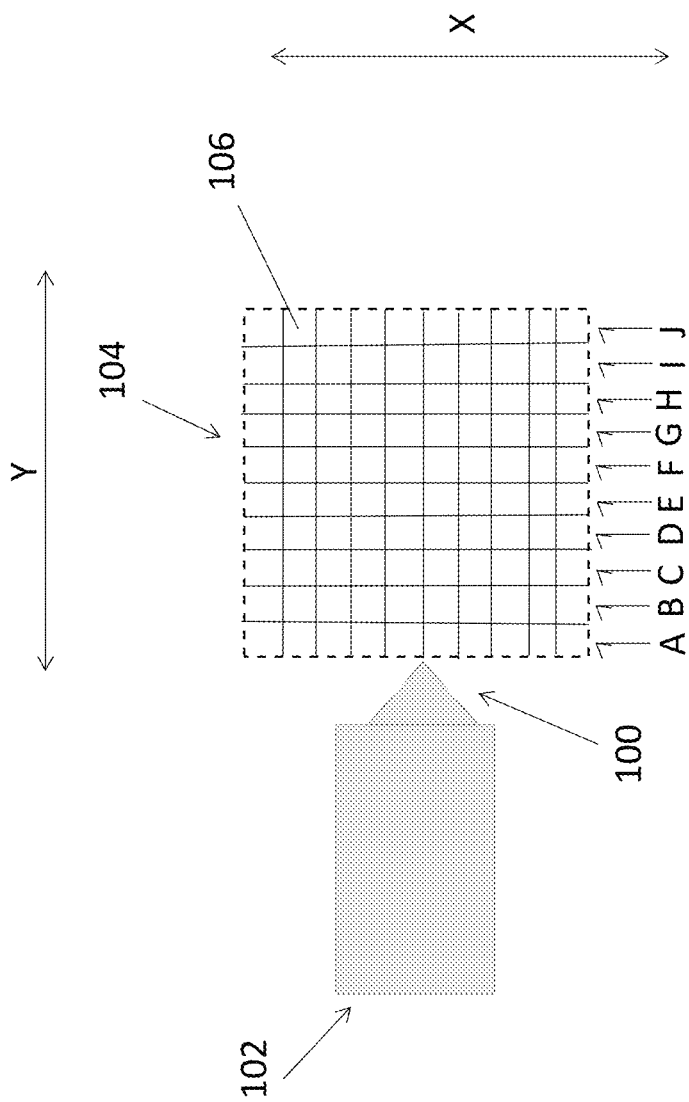

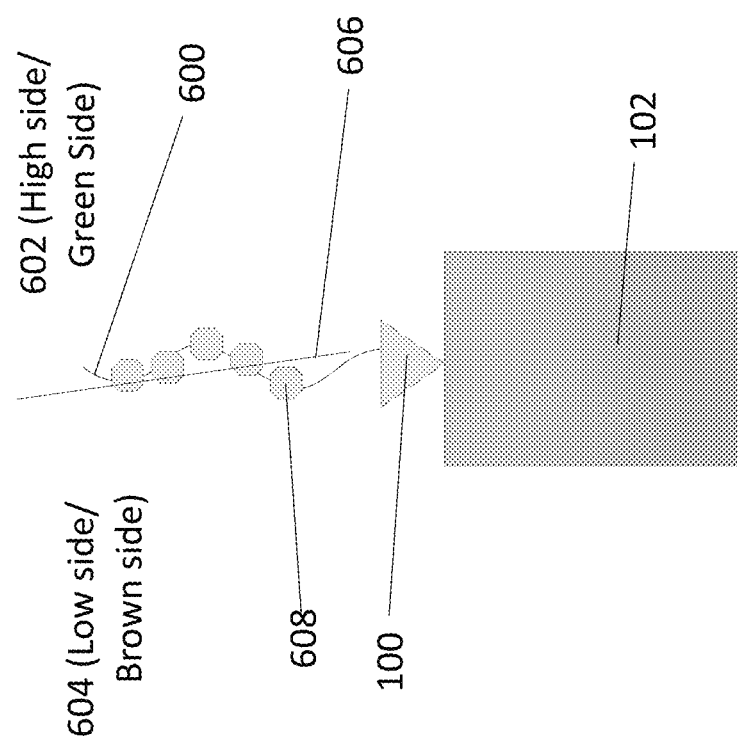

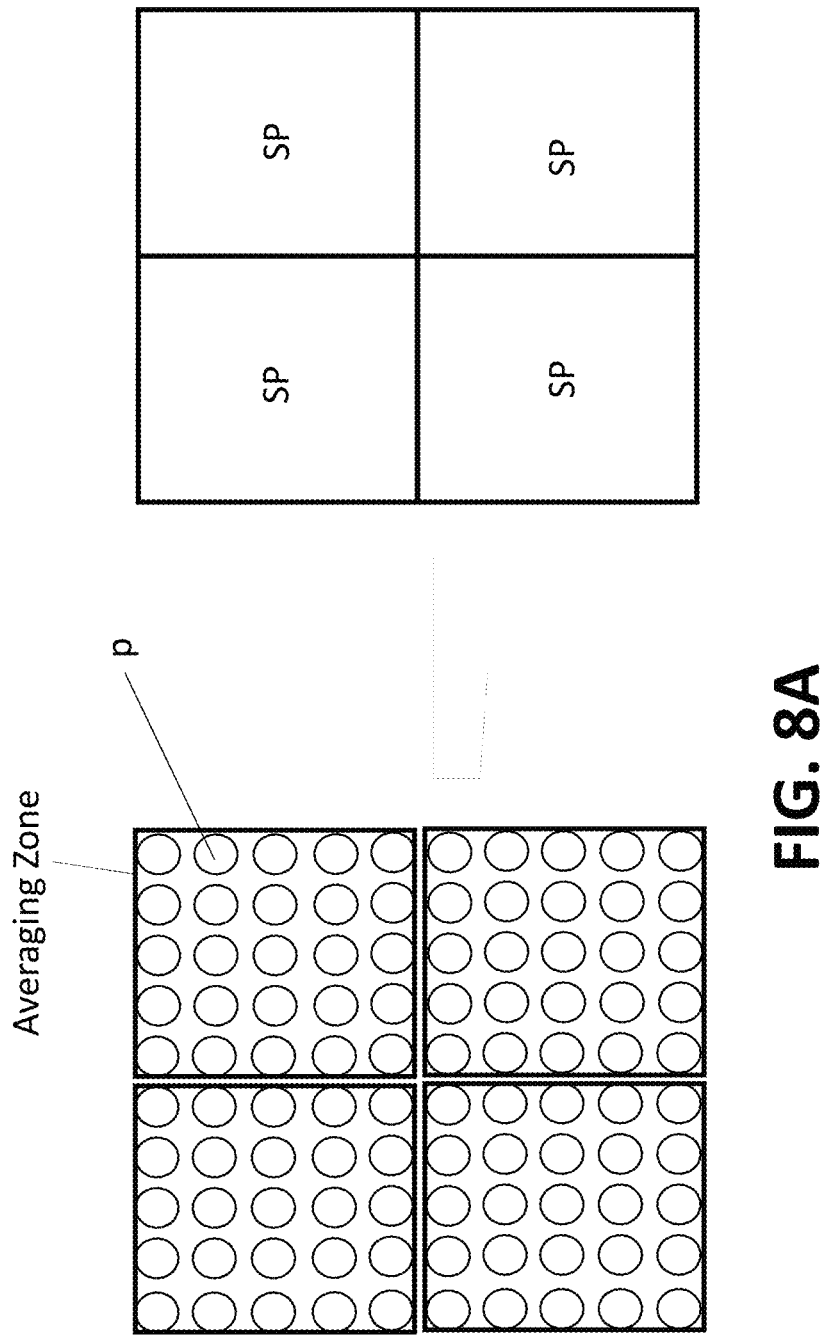

SENSORS, SOD HARVESTER WITH THE SENSORS AND METHODS FOR STEERING OR GUIDING SOD HARVESTERS

CROSS-REFERENCE TO RELATED APPLICATIONS AND CLAIM TO PRIORITY

This application claims the priority of U.S. Provisional Patent Application Nos. 62/836,172, filed Apr. 19, 2019, 62/910,034, filed Oct. 3, 2019, and 62/961,814, filed Jan. 16, 2020, the disclosures of which are incorporated herein by reference FIELD OF THE INVENTION The present invention relates to an apparatus and a system for steering or guiding a sod harvesting machine (sod harvester) with a high degree of precision, without the need for the sod harvesting machine to have a guide stick or shoe in physical or mechanical contact with the sod to be harvested or to be in connection with remote navigation systems, such as GPS.

BACKGROUND

Sod is a section of turfgrass that has been cut away from a field or grown in transportable media, such as trays, for the purpose of being transplanted to a different location. Sod harvesting is known in the art. Typically, a sod slab is cut free from a sod field. The slab is then left flat, folded, or rolled into a cylindrical roll that is transferred to a pallet by a sod pickup mechanism. Numerous devices are available for mechanizing portions of the sod harvesting and delivering process. For example, U.S. Pat. No. 5,230,602 discloses a sod roll stacker for stacking rows of small rolls, while other devices are available for cutting and rolling small rolls and big rolls, and other devices are available for cutting small slabs and large slabs.

When the sod is cut free from the field, the sod blade that cuts the sod free from the ground is a fixed width. This fixed width property of the sod blade means that if the steering of the harvester is not precise, the sod slab that is harvested may be either too skinny or a ribbon of sod is left on the field that is now too skinny to be harvested and becomes waste.

If the sod slab is consistently too skinny, it is inconvenient and potentially costly for the end user doing installation. In the case of an expected sod slab size of 24 inches wide by 60 inches long (10 square feet), cutting slabs 1 inch skinnier would make each slab 23 inches wide by 60 inches long, resulting in a slab of 9.583 total square feet. This means that 0.417 feet are missing from each slab, which in turn means that paying customers are not getting what they paid for. In terms of installation one would need 24 slabs of sod of the skinny 23 inch by 60 inch slabs for every 23 of the expected 24 inch by 60 inch slabs. When extrapolated over 10,000 square feet of coverage, it would mean that the end user would have ordered 1000 slabs of sod to cover the area, but would find that 417 square feet more of sod would still be needed because of the skinny slabs due to inaccurate steering during harvesting, an error of approximately 4 percent.

If a ribbon of sod is consistently left behind, it is bad for the producer as it goes to waste. Using the anticipated size of 24 inches by 60 inches for each slab, leaving a 1 inch ribbon over the length of a single slab would result in a 1 inch by 60 inch ribbon, 0.417 square feet, of waste. Extrapolated over an acre (43,560 square feet), approximately 41,817.6 square feet would be successfully harvested, leaving 1742.4 square feet of waste. Again, this is an approximate error of 4 percent.

Because these errors are based on the width of the sod slab, the error diminishes as the target width of the sod gets wider, but conversely the error grows greater as the target width of the sod gets smaller (skinnier). A 24 inch width was used in the examples as it is currently a very common width for small roll and small slab sod.

In a worst-case scenario, a single slab of sod could have both of these problems at different points during its harvesting, leading to a wavy edge that would make the installation of the slab much harder in addition to the other issues.

Therefore, the goal of steering a sod harvester is to maximize the width of the sod slab being harvested, while minimizing the wasted ribbon left over. In other words, the goal is to make sure that the edge of the sod blade stays as close as possible to the boundary where unharvested sod meets harvested sod, which can be referred to as the harvesting line or the harvesting boundary, while the sod harvester is moving and harvesting.

There are currently 3 main methods that are accepted for steering a sod harvester: manual operator steering, Global Positioning Satellite (GPS), and the use of a guide stick or shoe extending forwardly from the harvester. Each of these have problems. One problem with the operator manually steering the sod harvester is that the accuracy is completely dependent on the skill level and attentiveness of the operator, which leads to a problem of repeatability. While an experienced operator may be able to steer an accurate line, typically a new operator will not. Some operators may never learn the skills to steer accurately. Additionally, steering accurately requires almost constant focus on steering, so as to prevent drift of the harvester. Sod harvesters are complex machines with many moving parts and many possible points of failure, so it is best practice to pay attention to many parts of the machine, and not solely focus on the steering.

GPS steering solutions, while being contactless and very good at providing a straight line when opening up a new field where there are no particular bounds to follow, ultimately fail in pass-to-pass accuracy. GPS accuracies are about +/−16 feet without corrections. With satellite corrections, some GPS services can provide corrections for accuracies of about +/−3 inches, which is not precise enough based on the need for precision to prevent waste. Real-Time Kinematic GPS (RTK GPS) solutions could potentially provide closer accuracies, but examination shows there could still be significant errors. RTK GPS solutions require at least 2 GPS Receivers (a base station and a rover) with some method of communication between them, which typically is wireless. The base station remains in a fixed location, and can send corrections to the rover (or multiple rovers), which are mobile, having a best error of +/−1 centimeter (0.394 inch) when conditions are perfect. Even under these conditions, there is still the potential for a 2 centimeter (0.787 inch) gap (or overlap) from one pass to the next, and the accuracy of RTK GPS degrades with increasing distance between rover and base station. At its best, based on the expected errors from the previously defined dimensions of 24 inches by 60 inches for target sod slab size, a 0.787 inch gap or overlap would lead to sod harvesting error (waste or smaller than expected end product) of approximately 3.1 percent. The most common method currently used to steer a sod harvester is a stick or shoe extending forwardly from the harvester that rides on the ground at the lip where the edge of the last pass harvested (lower edge boundary) meets the unharvested field (higher edge boundary). This shoe can provide mechanical or electrical feedback to the sod harvester and can assist in steering the machine. While now the best solution, the steering shoe fails in a number of ways.

Firstly, the shoe, despite its length, is essentially only monitoring one point of the harvesting line, a fixed distance from the front of machine. This means that if there are curves or waves in the harvesting line, this method of steering can have trouble following those waves and curves accurately or intelligently, leading to skinny or wide cutting, and potentially the inability to straighten those curves or waves. Secondly, the shoe is a mechanical device that relies on physical contact with the harvesting line to function properly. If there are any obstacles on or near the harvesting line, they can deflect the shoe, causing erratic steering or potentially break the shoe, leaving it unable to function. Additionally, since the shoe is constantly in contact with the ground while harvesting, it will eventually wear down, which ultimately leads to needing a replacement shoe, but can also make the current worn shoe track untruly, and randomly pull off the harvesting line if it hits a groove just right. These issues lead to the reality that the operator cannot just set the steering shoe and forget it, as missed tracking of the shoe is still too common an occurrence. Finally, just the setting of the shoe on the harvesting line can be an annoyance, as most of the time the shoe is controlled by a hydraulic or electrical lift to raise and lower it, and it rarely gets placed correctly on the harvesting line when first lowered, creating the need to raise and lower the shoe multiple times and hope that it lands in the right spot, or having the operator physically climb out of the harvester and manually place the shoe in the right spot.

There remains a need for a contactless system for efficiently detecting the boundary between surfaces of different heights and/or different colors to steer a sod harvesting vehicle with a high level of precision, accuracy, repeatability, consistency, and longevity, which allows the sod harvester to operate more efficiently and makes the harvester operator's job easier.

SUMMARY OF THE INVENTION

An aspect of the present invention provides an optical sensor for detecting a boundary between two surfaces of different heights. The boundary information generated by the sensor is used to steer a sod harvester along a path where one side of the path is of a different height, on average, than the other side, such as the cut away edge of a sod field. The sensor acquires height information of an area in front of the sod harvester, processes it, and controls steering in a loop so as to give constant feedback and make necessary steering corrections in real time.

Another aspect of the present invention provides an optical sensor for a boundary interface of different colors. The boundary information generated by the sensor may be used to steer a sod harvester along a path where one side of the path is of a different color, on average, than the other, such as the green grass color of sod to be harvested contrasted with the brown to black color of the dirt or soil remaining after the sod has been harvested. The sensor acquires color information of an area in front of the sod harvester, processes it, and controls steering in a loop so as to give constant feedback and make necessary steering corrections in real time.

Another aspect of the present invention provides a system for determining a boundary between surfaces of different heights and/or colors and guiding the sod harvesting vehicle along that boundary. The system includes a sensor, a computer, and/or navigational equipment, which are in electronic communication. The computer processes distance and/or color information gathered by the sensor and the navigational equipment to determine the boundary and, in certain embodiments, to guide the vehicle along that boundary.

Another aspect of the present invention provides a vehicle, such as a sod harvesting vehicle, having a sensor mounted thereon for detecting a boundary between two surfaces of different heights and/or a boundary determined by color differences (the harvesting line/boundary). Preferably, the vehicle includes the system for determining a boundary and for controlling the steering of the vehicle in response to the detected boundary.

A further aspect of the present invention relates to method and apparatus for guiding a vehicle, such as a sod harvester, using information generated by a sensor for detecting a boundary between two surfaces of different heights and/or a boundary determined by color differences mounted thereon and for controlling the steering of the vehicle in response to the detected boundary.

Yet another aspect is a system for sod harvesting comprising a sod harvester and a sensor mounted to the sod harvester and configured to image an area of the ground in front of the sod harvester. A processor is operably associated with and configured to receive image information from the sensor, to determine, from the image information, a harvesting line boundary in the area, and to steer the sod harvester along the harvesting line boundary, such as by controlling the operation of the hydraulic system that steers the sod harvester.

BRIEF DESCRIPTION OF THE DRAWINGS

The foregoing background and summary, as well as the following detailed description of the drawings, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 1A shows a representation of a sod harvester with a sensor mounted thereon and the area to be scanned by the sensor;

FIG. 6 shows an exemplary boundary and derived path for guiding the vehicle;

FIG. 8A shows a 10×10 grid of pixels with averaging zones being next to each other;

FIG. 8B shows a 10×10 grid of pixels with averaging zones having spaces in between.

DETAILED DESCRIPTION

Figure 1B:
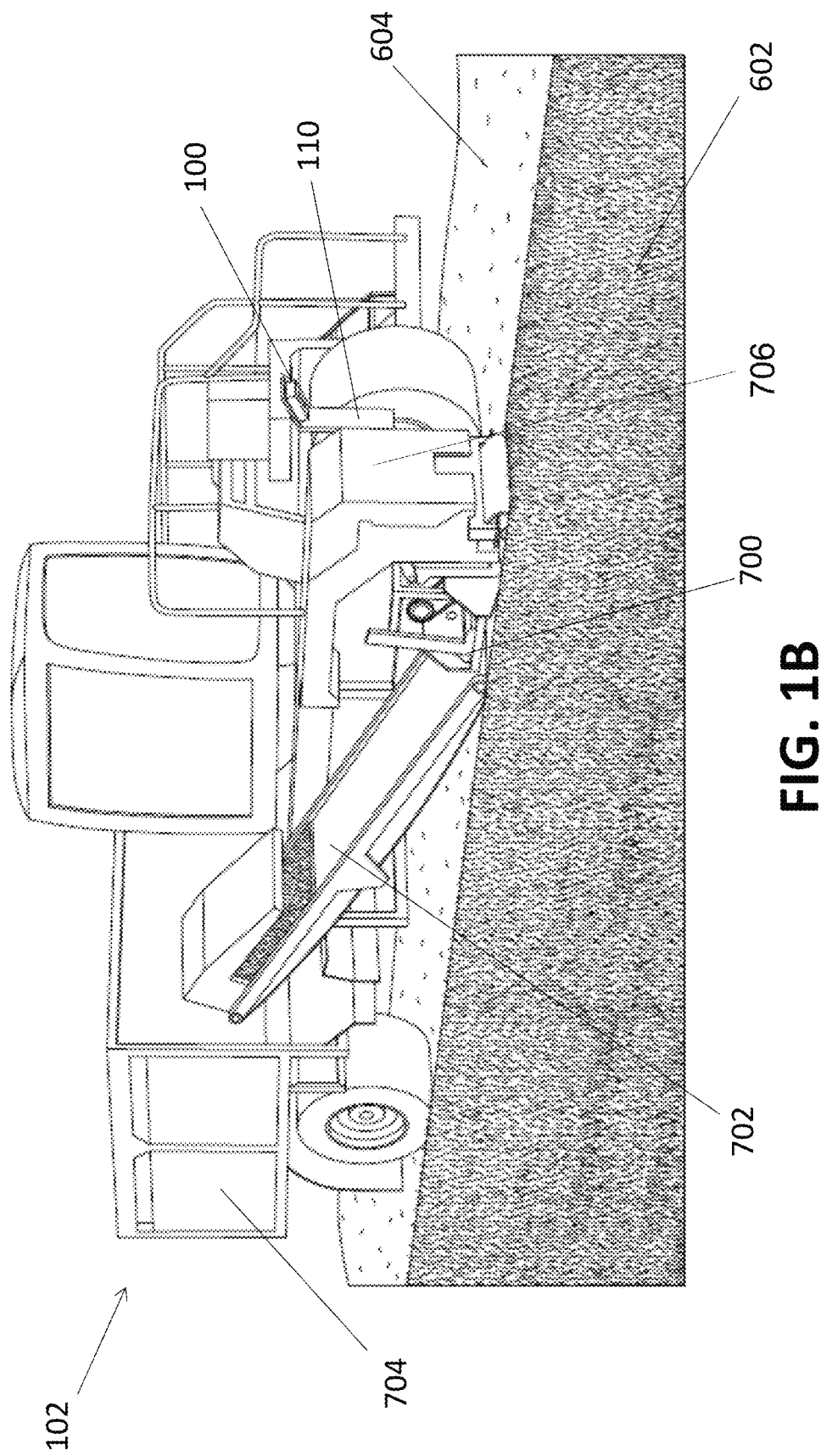
FIG. 1B shows a perspective view of a sod harvester with a sensor mounted to the front thereof.

The exemplary embodiment(s) of the present invention will now be described with the reference to accompanying drawings. The following description of the preferred embodiment(s) is merely exemplary in nature and is in no way intended to limit the invention, its application, or uses.

For purposes of the following description, certain terminology is used in the following description for convenience only and is not limiting. The characterizations of various components and orientations described herein as being "front," "back," "vertical," "horizontal," "upright," "right," "left," "side," "top," "bottom," or the like designate directions in the drawings to which reference is made and are relative characterizations only based upon the particular position or orientation of a given component as illustrated. These terms shall not be regarded as limiting the invention. The words "downward" and "upward" refer to position in a vertical direction relative to a geometric center of the apparatus of the present invention and designated parts thereof. The terminology includes the words above specifically mentioned, derivatives thereof and words of similar import.

The present invention provides an optical sensor 100 for detecting a boundary between two surfaces of different heights (a high surface and a low surface). The sensor 100 is preferably mounted on a sod harvester 102 to determine the distances between the sensor and locations in an area 104 in front of the sod harvester 102. While the sensor 100 preferably is used with sod harvester 102, other sorts of mechanized vehicles may utilize the sensor 100 to control steering and operation. Although FIG. 1A shows the sensor 100 mounted on the front of the sod harvester 102, the sensor 100 may be mounted elsewhere on the vehicle 102 as long as sensor 100 has a clear view of the area 104 in front of the harvester 102. For example, the sensor 100 may be mounted on top or on either side of the sod harvester 102. The sensor 100 is a non-contact distance measuring sensor system, utilizing sensors such as infrared distance sensors, ultrasonic distance sensors, microwave distance sensors, laser distance sensors, vision distance sensors, radar distance sensors, capacitive distance sensors, and other non-contact distance measuring sensors. The distance measuring portion of sensor 100 measures distances from the sensor 100 to different points or locations 106 on the ground surface in the area 104.

Figure 1C:
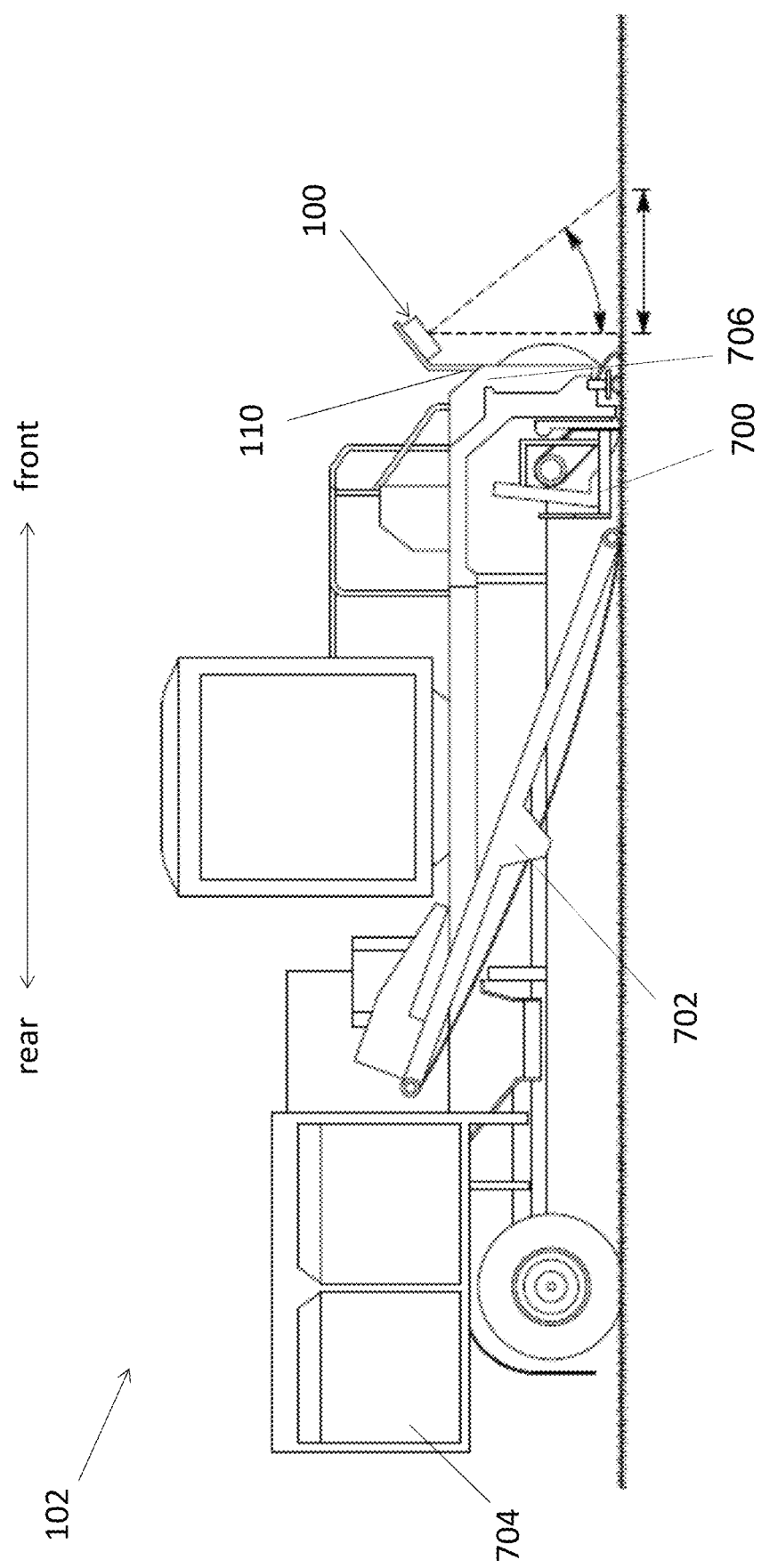
FIG. 1C shows a side view of the sod harvester of FIG. 1B.
Figure 1D:
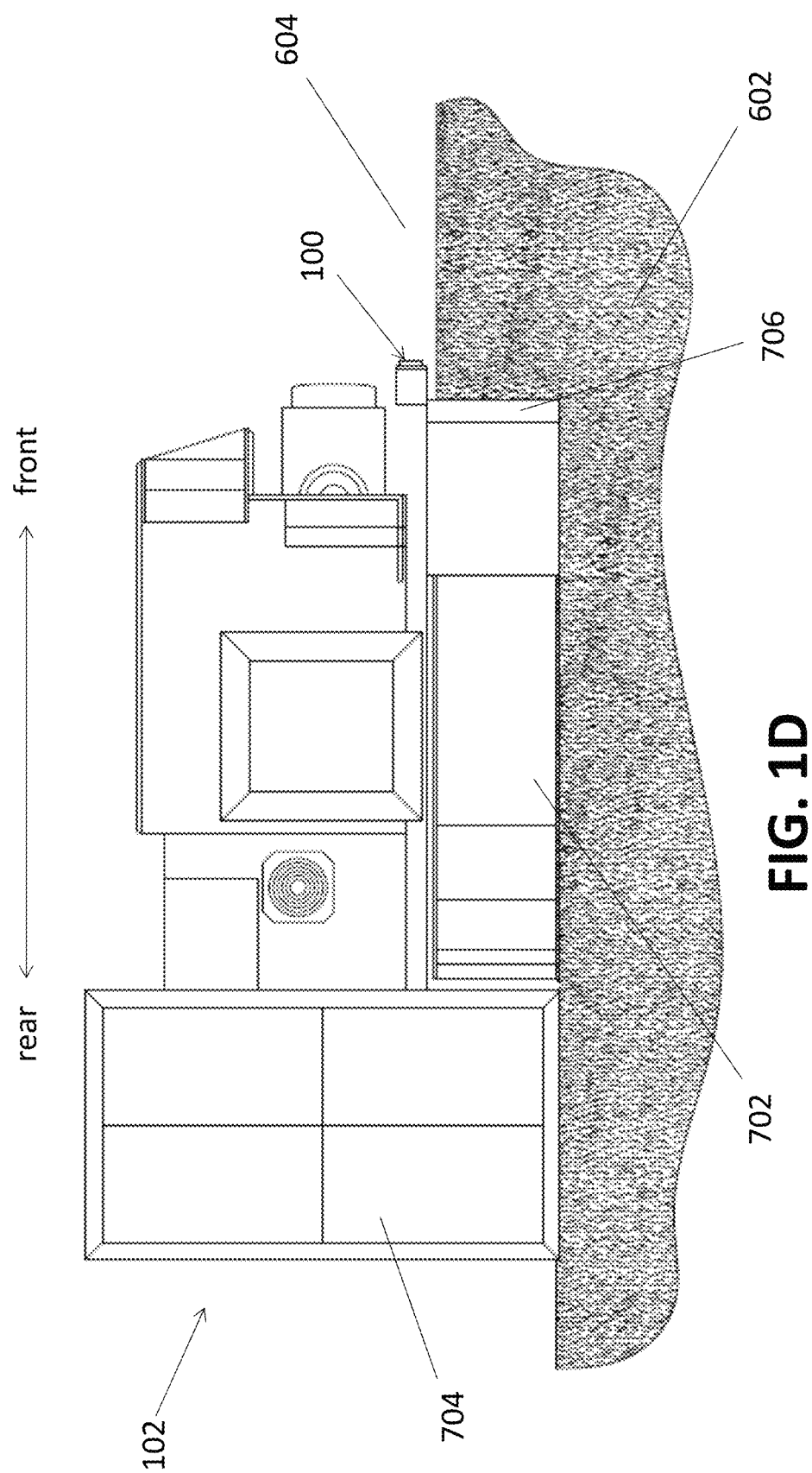
FIG. 1D shows a top view of the sod harvester of FIG. 1B.
Figure 7:
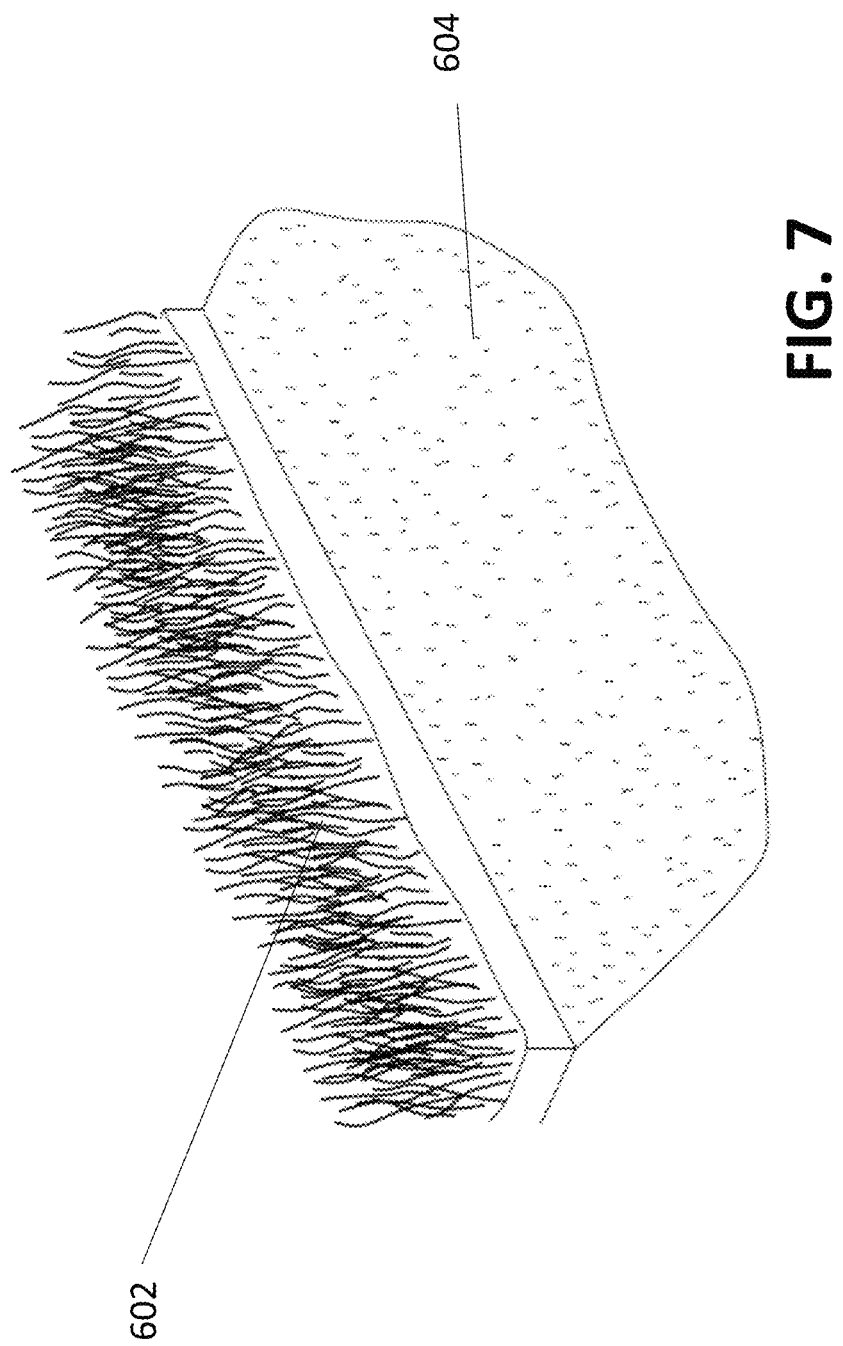
FIG. 7 shows the boundary interface between unharvested and harvested sod.

In preferred embodiments, as best shown in FIGS. 1B-1D, the sensor 100 is mounted on the front of the sod harvester 102. The sod harvester 102 has a blade 700 toward the front to allow the harvester 102 to cut and remove sod from the ground as the sod harvester 102 moves forwardly. After cutting, the sod is transferred to a conveyor 702 which transfers the sod to a storage area 704 where the sod is either stacked (typically onto a pallet for small rolls and small slabs), rolled into a big roll, or folded into a slab stack. Small rolls are typically rolled up somewhere on the conveyor 702 before reaching the storage area 704. As the sod harvester 102 moves forwardly and harvests the sod, it creates a spaced horizontal surface comprising a high side 602 containing grass and a low side 604 containing soil (see FIGS. 1B, 1D, and 7). The sensor 100 is configured to determine the boundary between the high/green side 602 and the low/brown side 604 in front of the harvester 102, and to steer the sod harvester 102 along that boundary, such as by controlling the hydraulic system that steers the harvester 102. The sensor 100 determines the boundary by sensing differences in elevation and/or color between the high/green and low/brown sides, through determining height and/or color between the high side 602 and the low side 604. The height difference between the high side 602 and the low side 604 typically is on the order of one inch (1") to three inches (3").

Figure 1E:
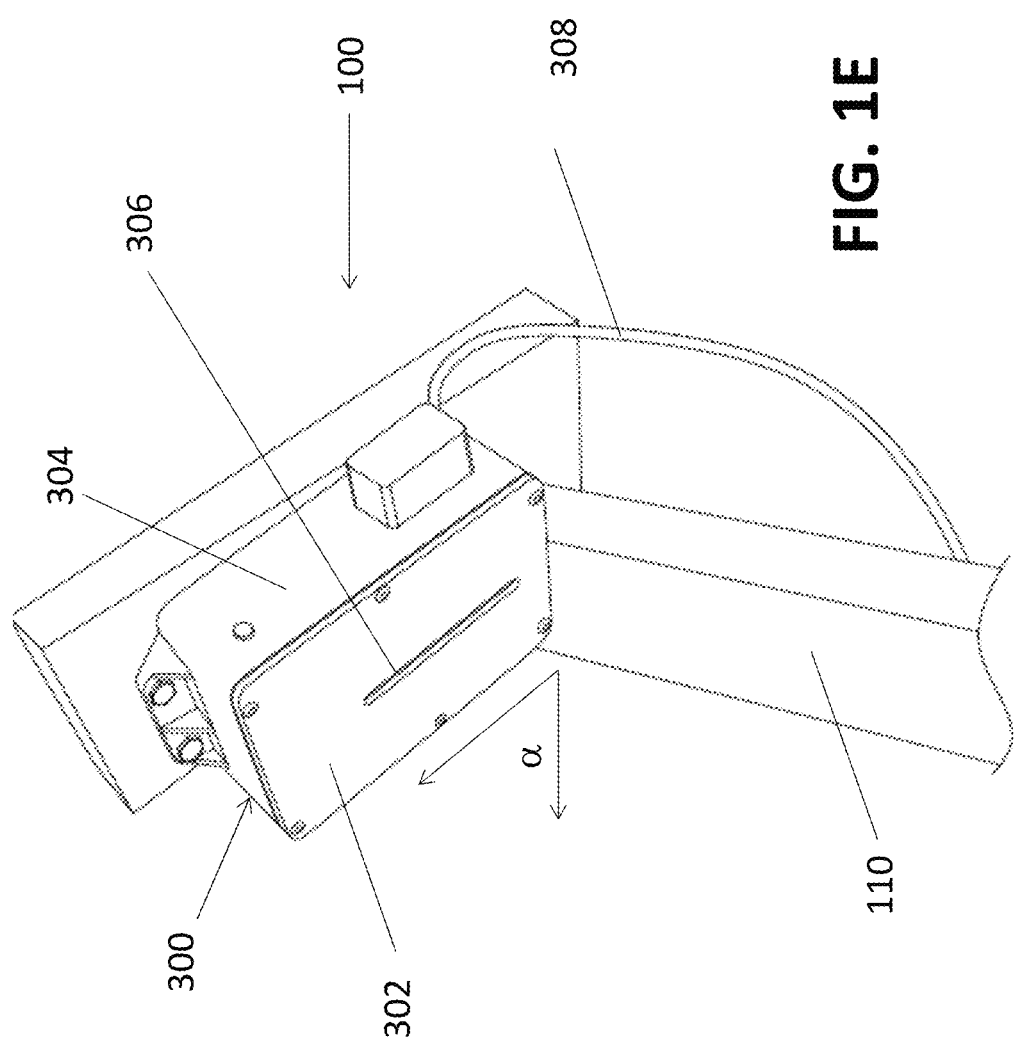
FIG. 1E shows a close-up view of the sensor of FIG. 1B.

The sensor 100 is mounted at the front of the sod harvester 102, preferably on a mounting bar 110 that is preferably attached to the cutter head or cutter head frame 706. Preferably, the mounting bar 110 is configured so that the sensor 100 is positioned at an angle α with the horizontal (FIG. 1E). The angle α can be about 0 to about 90 degrees depending upon mounting height and placement in relation to the front of the cutter head 706. Preferably, the sensor 100 is mounted about 2.5 to 3 feet above the ground, in front of the forward-most part of the cutter head 706, and at an angle α of about 25 to about 30 degrees, with the centerline of the sensor 100 closely aligned with the harvesting line side (boundary where unharvested sod meets harvested sod) edge of the sod blade 700. Thus, when the sod harvester 102 is harvesting the centerline of the sensor 100, the harvesting line outer edge of the sod blade 700, and the harvesting line itself form a plane that is perpendicular to the ground and parallel with the direction of travel/harvesting (i.e., all three are at the same placement in the X dimension).

The sensor 100 targets an area 104 immediately in front of the cutter head 706 to about 5 feet in front of the cutter head 706, about 7 to 12 inches, preferably 9 inches, to the left and right of the harvesting line, and all the area contained within, for an area of interest approximately 18 inches in the X dimension and 5 feet (60 inches) in the Y dimension. The X and Y dimensions are as shown in FIG. 1A, where the Y dimension is in a direction parallel to the front-to-rear axis of the harvester and the X dimension is perpendicular thereto. The sensor 100 preferably has a full view of the area 104 in front of the harvester 102 without obstruction.

As illustrated in FIGS. 1B-1E, the mounting bar 110 has one end mounted to the front of the cutter head frame 706. The sensor 100 is mounted to the other end of the mounting bar 110. The harvester end of the mounting bar 110 can vary in length and angle depending on the particular sod harvester to which it is mounted, but should be sturdy and rigid so as not to amplify or exacerbate vibrations caused by the sod harvester 102 and the cutter head 706, to ensure that the sensor 100 is stable. The sensor end of the mounting bar 110 is angled away from the harvester 102 to point the sensor 100 downwardly at angle α toward the ground, as best shown in FIG. 1E.

Figure 1F:
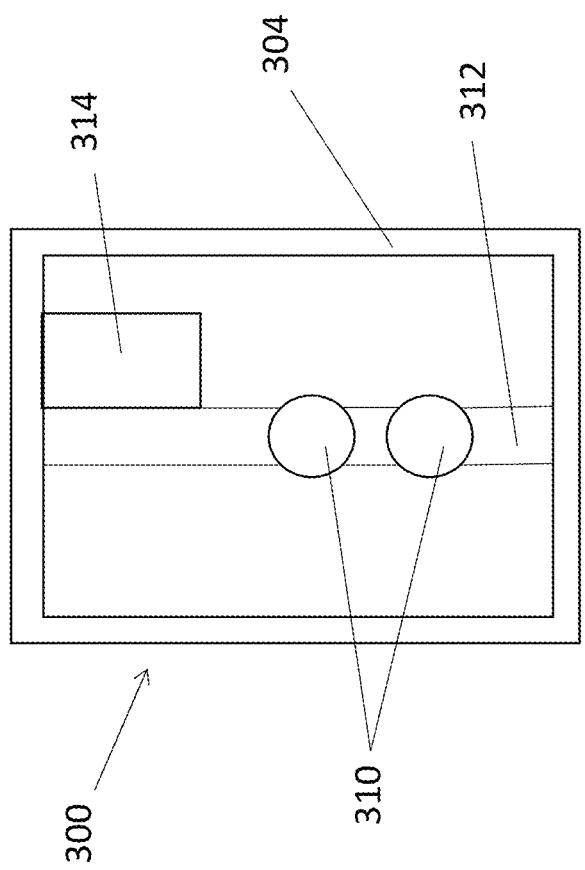
FIG. 1F shows the interior of the sensor box with the lid removed.

As shown in FIGS. 1E and 1F, the sensor 100 contains electronics equipment that is contained within a container 300. The container 300 is preferably a rectangular box and has a lid 302 to enclose main box 304. The main box 304 defines an interior volume for containing and protecting the electronics equipment, including, but not limited to, an internal computer/processor to analyze the depth map and/or color map generated by sensor 100 to determine the boundary between the high/green side (grass side) 602 and the low/brown side (dirt side) 604. The high/green side 602 contains unharvested grass, while the low/brown side 604 contains mostly soil with essentially no grass as the grass has been harvested (see FIG. 7) during the preceding harvester pass. The internal computer/processor may be integral to the sensor 100 and may be a part of sensor 100. Alternatively, the computer/processor may be located remotely from the sensor 100 and connected to the sensor 100 wirelessly, such as via Bluetooth or by wire. The lid 302 covers main box 304 and is attached to the main box 304 with fasteners, such as screws, rivets, nuts, etc. The lid 302 preferably forms a watertight seal with main box 304. The lid 302 contains an elongated narrow opening 306 through which signals to determine depth and/or color information, typically light, pass from or to the electronics within container 300. In a preferred embodiment, as shown in FIG. 1E, the opening 306 is a slit having a length of about 80 mm to about 85 mm and a width of about 8 mm to about 11 mm. The length is preferably aligned in the fore-aft direction of the harvester 102. The elongated narrow opening 306 allows the sensor 100 a direct view of the ground without interference. The container 300 is mounted to the mounting bar 110 by one or more fasteners, such as screws, nuts/bolts, rivets, etc.

The integral computer/processor processes the signals from the sensor 100 to determine the boundary between the high/green side 602 and the low/brown side 604 in front of the harvester 102 (as described below). Once that boundary is determined, the computer/processor can steer the harvester 102 along that boundary. In one embodiment, the sensor 100 can steer the harvester directly by operating one or more hydraulically operated steering cylinders to control the position of the steering wheel or of the wheels directly. The steering signals are carried by an interface cable 308, such as one carrying signals based upon a universal serial bus ("USB"). In other embodiments, where the existing sod harvester has an onboard computer to steer by one of the existing means mentioned above, e.g. by a shoe, sensor 100 and the integrated processor send signals to the existing steering computer onboard the harvester 102, replicating the signals originally used by the sod harvester's steering feedback method, typically analog voltage or a serial communications protocol. In certain embodiments, the signals may be sent from sensor 100 to the external steering computer via a cable 308. Alternatively, signals may be sent from sensor 100 to the external steering computer wirelessly, such as via Bluetooth.

Different measuring sensors may use different techniques to derive distance. In the "Infrared Time of Flight" method, an infrared sensor transmits an infrared signal from an infrared LED and receives through the slit 306 the reflected response at an integrated circuit within housing 304. The angle between the transmitted and received signals determines the distance based upon geometry. Because the harvester 102 moves relatively slowly, distance traveled during the time of flight is immaterial. This method is highly accurate, but may have issues when used outdoors. Because it relies on coded or timed infrared light signals, care must be taken that interference created by the sun in the infrared spectrum does not adversely affect the ability to accurately measure distance.

Another measuring sensor uses ultrasonic sound to determine the distance to the surface. The ultrasonic measuring sensor transmits a sound wave pulse and receives an echo from the surface. By comparing the time between the transmitted pulse and the received pulse, distance can be determined.

A further measuring sensor uses microwaves to determine the distance to the surface. A wideband microwave/radar pulse is transmitted to the surface and the received echo is compared with the transmitted pulse to determine distance.

A yet further sensor is a capacitance distance measuring sensor which measures the capacitance from the surface. The capacitance is greater when the measurement sensor is close to the surface and less if the sensor is further away.

Other distance measuring sensors, such as laser distance sensors and vision distance sensors, may also be used for distance measuring according to the present invention. In certain embodiments, a color sensor, such as a CCD camera, may be used.

The sensor 100 may measure distance in several ways. In all embodiments, the goal of measuring the distances is to create a distance map, also known as a depth map. A depth map is similar to a digital picture, in that pixels are arrayed in a 2 or 3 dimensional array. Instead of each pixel containing color information, each pixel contains depth information. Preferably, the depth pixel contains X, Y and Z values to locate a pixel in a three dimensional (3-D) Cartesian coordinate space. Other dimensional systems which accurately describe the depth pixel's location in a 3-D space may be used to implement the methods herein described.

In a first embodiment, the sensor 100 is formed from a physical grid of N×M individual sensors with known fixed spacing between them. For example, 100 individual sensors may be placed in 10 rows of 10, each 1 inch apart center to center. Each sensor measures the distance to a point or location 106 in the area 104. The results from individual sensors provide a distance map of 100 pixels, where each pixel maps to a point 106 on the ground surface in the area 104 and each point has its location value specified in the X, Y and Z coordinates determined. Each pixel contains the distance from the individual sensor to the corresponding point 106 and the coordinates for that point 106. In other words, there are 100 sensors in the grid and each sensor measures to a point 106 unique to that sensor; i.e., 100 points for the grid.

In a second embodiment, the sensor 100 may be a linear array of N individual sensors. The line of N sensors scans the area 104 row by row, moving along a grid-like path. The distance readings for each row (A to J) are stored. When all the rows in area 104 are scanned, the readings are then integrated into a distance map. For example, the sensor 100 may contain a linear line of 10 individual sensors. The sensor 100 first scans row A, and the distance (coordinates) to each of the points 106 in row A is then stored. The process is then repeated sequentially with rows B through J, for example. Once the scan is completed, the stored coordinate information is used to generate a distance map, with each pixel on the map containing information about the location of each point 106 and the distance to each point 106. Because the sensor 100 must be moved to scan each row in the area 104, complexities may be introduced due to equipment needed to control and move the sensor 100. Preferably, the sensor provides at least 36 pixels in the X dimension by 120 pixels in the Y dimension (36(X) by 120(Y)).

In a third embodiment, similar to the first embodiment, the sensor 100 is a two-dimensional array of individual sensors. But instead of arranging the individual sensors in a two dimensional (2-D) Cartesian grid, the individual sensors are arranged in a spherical arc configuration. In this configuration, the back side of all the sensors point to the same point in space (the origin), and the front sides point away from the origin. This method lends itself to creating a distance map of polar coordinate information. The predetermined angles at which the sensors are placed give the angular information (commonly referred to as phi and theta) for the pixels, and the distance measurement gives the distance from the origin (commonly known as rho). Because the sensors are not infinitely short, the measurement of each sensor is actually the distance from the sensor face to the associated point 106 in area 104. This technique requires more post-processing of the sensor data for the purpose of sod harvesting.

In a fourth embodiment, the sensor 100 is a single distance sensor used to scan area 104. The sensor may be moved in a 2-D Cartesian (X-Y) coordinate or a polar (phi-theta) coordinate technique. In this embodiment, the sensor 100 must be able to move in two directions to completely scan area 104.

In a fifth embodiment, the sensor 100 utilizes a "stereo vision" technique, in which two traditional color, black and white, or infrared cameras (as long as both cameras are the same) are placed a known distance from each other and take an image at the same time. By processing the differences and similarities of the two images, depth information may be calculated and a distance map created from the depth information. This method of comparing 2 images is similar to how human eyes work with the brain to provide depth perception. This method is processor intensive, but provides relatively high resolution and accuracy with relatively low cost parts, is not negatively affected by the sun, and is the preferred method of gathering depth information.

FIG. 1F illustrates an exemplary stereo vision camera system, with two cameras 310 inside the container 300 (with the lid 302 removed). The "Realsense D415" Camera system from Intel is an exemplary stereo vision camera system that includes two spaced cameras for acquiring the images to be analyzed, such as for the distance map, an illumination device to provide additional light for the cameras if there is insufficient external illumination available, and a processor that analyzes the images, e.g., to create a raw distance map. The raw distance map may be communicated to an external processor for further analysis (such as rotation, averaging, boundary finding, etc. necessary to determine the boundary line) via USB or the like. While the "Realsense D415" system is preferred for its compact design, availability, and reliability, one skilled in the art could use another available stereo vision system, or even design one from base components.

The cameras 310 are aligned with the length of the opening 306 on the lid 302 (see FIG. 1E for the slit 306), so that the cameras 310 each have a view of the ground through the opening 306. Preferably, the cameras 310 are mounted on a bar or printed circuit board 312 running through the center of the main box 304. The bar 312 is in alignment with the length of the opening 306 on the lid 302 in order to allow light to enter container 300 and impinge on cameras 310.

Each of the cameras 310 is preferably an infrared camera. The cameras 310 are vertically spaced approximately 2.5 inches apart center to center. An image processor 314 is also located in the container 300 and is operably connected to the cameras 310. The processor 314 captures an image from each of the cameras 310 every 30 to 50 milliseconds. The captured images are converted to black and white images. The converted images are compared and the depth map created.

Because the bar 110 is angled at a where the container 300 is mounted, the cameras 310 likewise are angled at a and do not look directly at the sun. The sun emits light of varying wavelengths that resembles white noise to the cameras 310. Further, the cameras 310 are each equipped to adjust the amount of light received, in order to avoid under- or overexposure of the images.

The cameras 310 each have a field of view that allows a relatively large image, preferably rectangular image, to be captured. It is preferred that the cameras 310 be vertically aligned, as illustrated, because that alignment maximizes the rectangular field of view from front to back (Y Dimension), rather than right to left (X Dimension), which maximizes resolution usage of the cameras 310 to the preferred area of interest of 18 inches (X) and 60 inches (Y). However, the cameras 310 may be aligned in any orientation, so long as a reliable distance map can be achieved by the stereo vision processor 314. Further, while a single slot 306 is utilized through which light is received, a plurality of openings could be used in place of the slot 306, so long as each camera still has as unobstructed view through the container 300.

Figure 2:
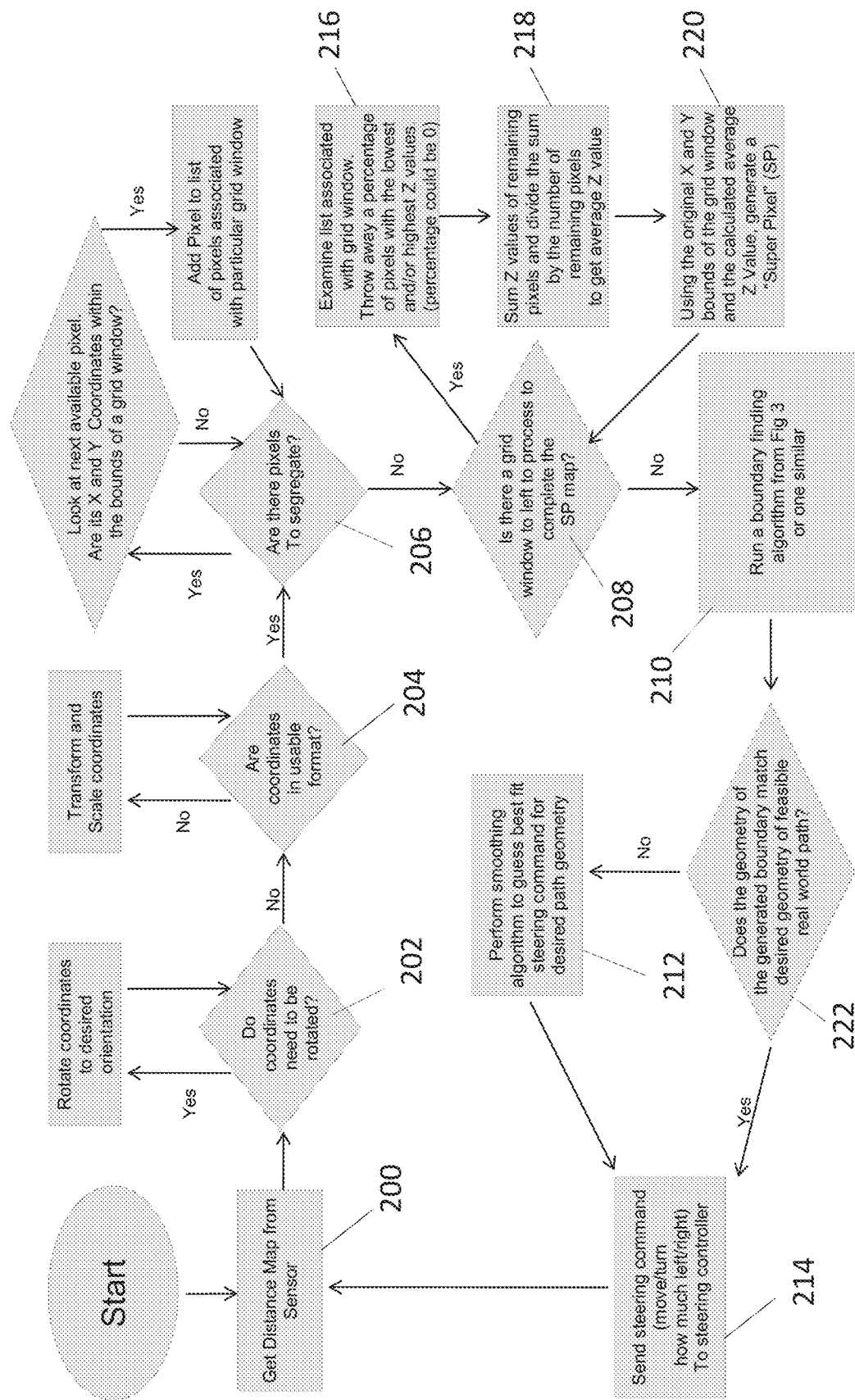
FIG. 2 shows a flow chart for processing and analyzing the distance map obtained from the distance sensor (based on using a Cartesian Coordinate System)

The sensor 100, by using one or more of the techniques disclosed above, allows a distance map to be generated for area 104 (200 in FIG. 2). Preferably, the sensor 100 is a stereo vision sensor. To generate accurate mapping over the area 104, the preferred minimum resolution is about 1 pixel per ½ inch. With the area 104 having dimensions of 18 inches (X Dimension) by 5 feet (Y Dimension) as previously mentioned, the preferred minimum distance map resolution is approximately 36(X) by 120(Y) pixels. Higher resolution distance maps require more processing power, as there are more pixels to process, but also provide higher accuracy. A higher resolution map is preferred as long as it is supported by available processing power.

FIG. 2 summarizes a process by which the distance sensor 100 and its associated computational system on the processor 314 derive a steering path from the distance map based upon a 3-D Cartesian coordinate system. From the measured distance from one point 106 to adjacent points 106, a boundary line and its location may be determined in the event distance differences are determined. The distance map may be rotated (202 in FIG. 2) to account for the angle of inclination of the sensor 100 relative to the horizontal and/or transformed to different coordinate systems (204 in FIG. 2) depending on the geometry of the area 104. For example, for relatively flat ground as is typically the case with sod harvesting, a 3-D Cartesian coordinate system is preferred. In the 3-D Cartesian coordinate system, it is preferred that the X-axis is perpendicular to the general direction of the vehicle, the Y-axis is parallel to the general direction of the vehicle, and the Z-axis is perpendicular to the general plane of the ground, which is effectively height. Transformation of coordinates is the process by which a point as defined by one coordinate system, such as polar coordinates (rho, theta, phi), is redefined to still exist at the same location, but referenced by different coordinates or a different coordinate system, such as Cartesian coordinates (X,Y,Z). If sensor 100 does not output a distance map in Cartesian coordinates, it is preferred to transform its output to Cartesian coordinates to make calculations more sensible for the case of sod harvesting. Rotation of coordinate systems is a subset of transformation, in which the same base coordinate system is used, but the axes of the new layout have been rotated by some degree. If the sensor 100 is mounted at 30°, and its output is in Cartesian coordinates with the X axis aligned parallel to the front face of sensor 100 from left to right and, the Y axis aligned parallel to the front face of sensor 100 from front to rear, and the Z axis perpendicular to the front face of the sensor 100, it is desirable for the coordinates to be rotated around the X axis by 30° so that the new coordinate alignment would place the Y axis parallel to the ground and parallel to the motion of travel, and the Z axis would be perpendicular to the ground, which is the preferred coordinate orientation for sensible calculations for the case of sod harvesting.

In this 3-D Cartesian coordinate system, the location of the origin of the Z-axis is arbitrary, as algorithms to determine the height boundary look for differences in height, rendering the need for absolute heights (i.e., exact height from the harvested ground) unnecessary. Utilizing an arbitrary height also eliminates the need to know the exact mounting height of the sensor 100. Therefore, it is preferred that the origin of the Z-axis be placed at the height of the sensor 100 for computation, so that effectively a point with a greater height from the ground up would have a smaller height from the sensor 100 down. For example, if the sensor 100 were mounted 30 inches above the ground, a point that exists 5 inches above the ground (taller) would be interpreted as 25 inches down from the sensor 100, while a point 2 inches above the ground (shorter) would be interpreted as 28 inches down from the sensor 100. That said, any coordinate system may be used for the present invention. The distance map contains individual pixels corresponding to points 106 in the area 104, where each pixel contains information on the position of the associated point 106 and the distance to that point 106, preferably stored as X,Y,Z coordinates that map to real world X,Y,Z coordinates in the Cartesian coordinate system laid out above.

Once the distance map has been established and coordinates have been properly transformed and rotated, an averaging method may be used to smooth out the data (206 and 208 in FIG. 2). Preferably, averaging of the distances (218 in FIG. 2) may be effected for pixels that fall within specified lateral bounds that have predefined X- and Y-dimensions in the area 104 (e.g. a 10 mm by 10 mm region in the XY plane) by summing the Z (height) values of all the pixels whose X and Y values fall within the specified lateral bounds, and dividing that sum by the number of pixels used to create that sum. For example, if examining the region in the area of interest defined by the real word Cartesian points (X, Y) in millimeters of (20, 50), (20, 60), (30, 50), and (30, 60), and it is found that 45 pixels have X components that are between 20 mm and 30 mm and Y components that are between 50 mm and 60 mm, the Z values (height) of those 45 pixels would be summed, and the resulting sum would be divided by 45 to get the average Z value (height) of the real world region.

Alternatively, the averaging may take place over a defined number of adjacent pixels, e.g. 100 adjacent pixels. In that case, the height (Z) values of the 99 pixels that are closest to a central pixel and the Z value of the central pixel are averaged by summing the Z values and dividing by the number of pixels. For example, if using a 10 by 10 pixel block for the region defined by the pixel locations (X,Y) on the depth map of (0, 0), (0, 10), (10, 0), and (10, 10), the Z values of those 100 pixels in that pixel region are summed, and the resulting sum is divided by 100 to get the average Z value (height) of the pixel region. In this case, it may also be necessary to define what the real world X and Y limits are for the region based on information from the pixels, since they were not defined prior to processing as they were in the previous example of using a 10 mm by 10 mm real world region. This may be done in many ways, but 2 exemplary methods would be to (a) average the X values and Y values (respectively) of the pixels, just as was done with the Z values to get a single averaged X value and a single averaged Y value for the real world region, or (b) capture the greatest and least X values and Y values, and use those 4 values to define the bounds of the real world region.

In both cases, the averaging produces a larger pixel, a "Super Pixel" (SP) (220 in FIG. 2), from neighboring pixels to produce a smoothed distance map. When using a 3-D Cartesian coordinate system, each SP contains X, Y, and averaged Z coordinate information, which can be translated to real world positions and averaged heights. The position in the X-Y Plane of the SP may also be averaged or centered based on the lateral bounds of the area selected for averaging. Position and size of SPs are determined based on the resolution of the sensor 100, and the processing power of the integrated processor 314. A greater number of pixels per SP (which can be proportional to a higher resolution of sensor 100), and also a greater number of SPs, require more processor power and/or time to analyze/compute. For effective averaging, at least 5 pixels per SP is preferred, while increasing the number of pixels per SP can achieve more effective averaging and smoother results.

The averaging techniques may be utilized over the complete area 104 or over smaller areas closer to the boundary. The lateral (X-Y) boundary of the area or the adjacent pixels to be averaged may be considered an averaging zone. Preferably, the different averaging zones are selected to be right next to each other, abutting and adjacent. For example, in a 100×100 grid of pixels, making each SP out of an averaging zone of 10×10 pixels and having them adjacent, a grid of 100 SPs would result. FIG. 8A shows an example of a 10×10 grid of pixels p, where the averaging zones are next to each other. The 10×10 grid is averaged to produce a 2×2 grid of super pixels SPs. In that case, each SP results from averaging 25 adjacent pixels p.

Figure 8B:
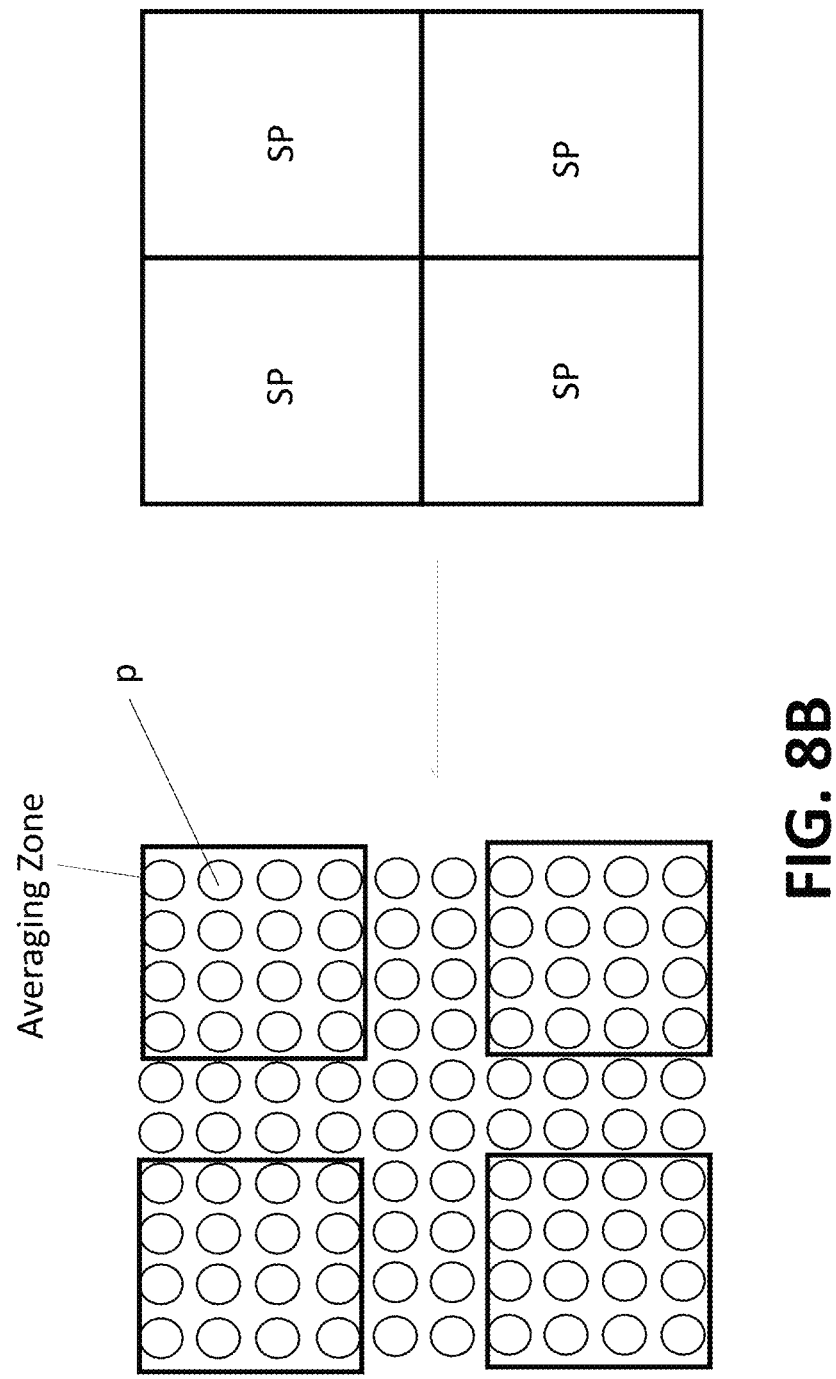
Figure 8C:
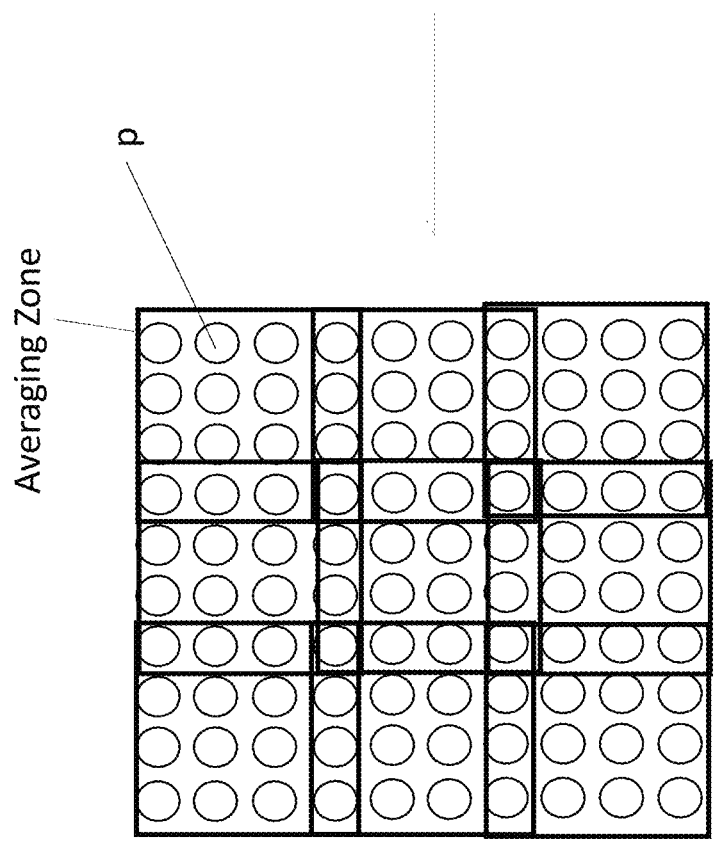
FIG. 8C shows a 10×10 grid of pixels with averaging zones being overlapped.

Depending upon resolution and processing power, it may be desirable to have space between averaging zones, or even overlapping averaging zones. In those cases, it is not necessary that the averaging zones be adjacent and abut each other, while computationally each SP would still be adjacent to and abutting the next SP. FIG. 8B shows an example of a 10×10 grid of pixels p, where the averaging zones contain spaces or gaps in between the zones. In that case, each averaging zone is spaced from its neighbors by two rows and two columns of pixels. Each SP results from averaging 16 adjacent pixels; and the averaging produces a 2×2 grid of SPs. FIG. 8C shows an example of a 10×10 grid of pixels p, where the averaging zones are overlapped. In that case, each average zone is overlapped with its neighbors by one row and one column. Each SP results from averaging 16 adjacent pixels; and the averaging produces a 3×3 grid of SPs. Although FIGS. 8A-8C show an exemplary 10×10 grid of pixels, a skilled person in the art would recognize that any number of pixels may be included in the grid. Additionally, the size of the averaging zones, the separation of the average zones, or the overlapping of the average zones may be varied as recognized by a skilled person in the art.

In certain embodiments, such as when resolution is too low to achieve effective averaging by syncing averaging zone size to SP size (too few pixels per averaging zone), it may be beneficial to expand the averaging zones and have them overlap. For example, using the previous example above of a grid of 100×100 pixels, instead of each averaging zone being 10×10 pixels, the averaging zone may be 20×20 pixels, but still centered 10 pixels apart. Conversely, in other embodiments, such as when resolution is high, but processing power is insufficient to analyze all pixels, it may be beneficial to have gaps in the averaging zones. Again, using the example from above of 100×100 pixels, this would be achieved by making each averaging zone 5×5 pixels, but still centered 10 pixels apart. All 3 examples provide 100 SPs, but the amount of data that resides in each SP varies: one produces data based on the exact limits of the desired SP, one produces data that shares overlapping information with one or more adjacent SPs, and one produces data that has gaps of information between SPs. It should be noted that the examples above are based on a starting resolution of 100× 100 pixels, and the breakdowns into different sized averaging zones are for demonstration purposes only, and are not necessarily the preferred arrangement.

By using pixel averaging over the entire distance map, the smoothed distance map (a grid or multi-dimensional array) is generated that may contain many fewer pixels (SPs) than the original distance map, but with greater repeatability, due to the averaging, within each zone. The averaging method allows the system to track a height boundary interface despite great amounts of texture that can exist on a surface. The averaging increases reliability in applications where there can be significant height differences on one or both sides of the path that may be ignored. In the application of steering a sod harvester 102, where at least one side is composed of blades of grass that could be relatively tall, of inconsistent height, and have spaces between the blades of grass, averaging has a beneficial impact on the accuracy of the sensor 100.

In certain embodiments, the averaging method may also be weighted, considering only the top percentage of the highest (or lowest) read pixels (i.e., if each averaging zone contains 100 pixels, only looking at the 60 pixels of middle quantum of height, while eliminating the 20 pixels that have the greatest height and the 20 pixels that have the lowest height from computations) (216 in FIG. 2). In an exemplary embodiment, about 60-100% of the middle quantum of read pixels are averaged, preferably about 80-90%. The weighting may be desirable to ensure that any extreme outlying pixels, like those that could result from reading a weed that is much taller than the grass around it, would not adversely affect or skew the results of the averaging. For example, if using an averaging zone of 100 pixels, and a desired weighting of 80% of the median Z values (height), the 10 pixels (10% of 100) with the lowest Z values would be thrown away, and the 10 pixels (10% of 100) with the highest Z values would be thrown away, and the Z values of the remaining 80 pixels (80% of 100) would be summed and divided by 80 (the number of pixel values summed) to get the weighted average Z value. The smoothed distance map is similar to the original distance map except that the individual SPs may contain information on a larger area than the original pixels.

The smoothed distance map is used to determine the boundary between two surfaces of different heights by comparing distances (height or Z values in a 3-D Cartesian Coordinate system) between adjacent Super Pixels. The boundary, in certain embodiments, provides a path to steer the vehicle (222, 210, and 212 in FIG. 2). Once the path is determined, it is used by the computer to steer the harvester 102 (214 in FIG. 2), such as by controlling the harvester's hydraulic controls or cooperating with the existing electronic control system of the harvester 102.

Figure 3A:
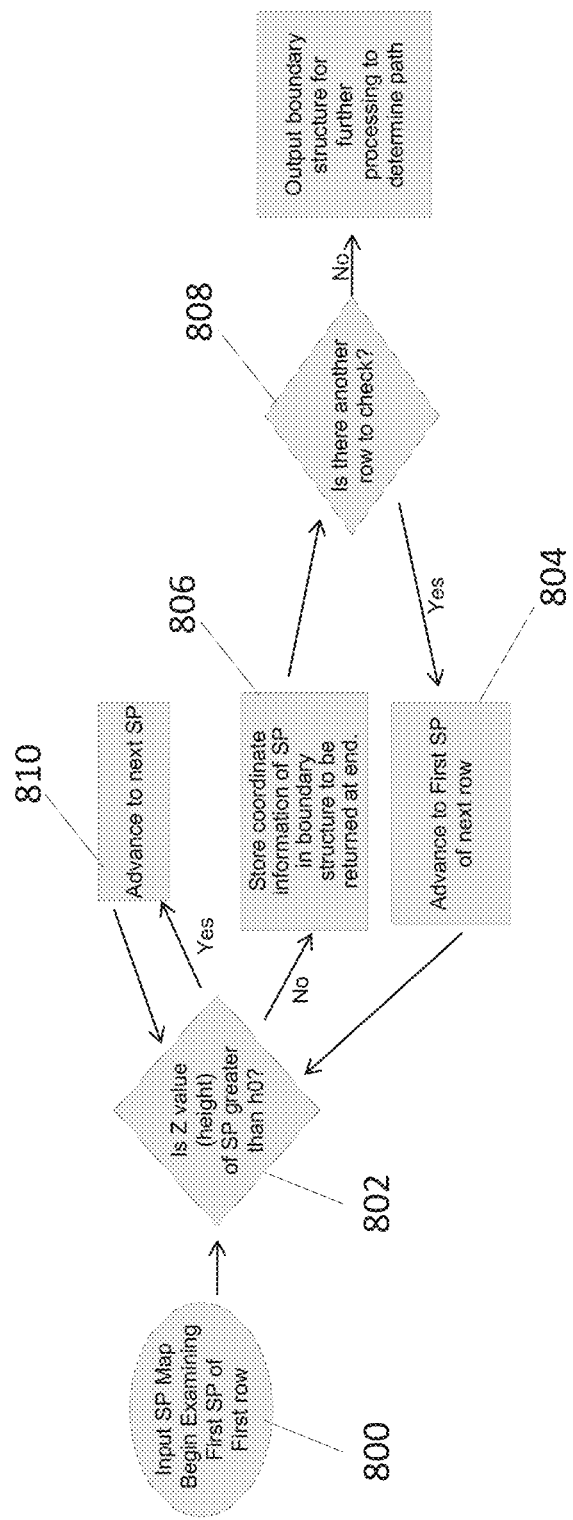
FIGS. 3A and 3B show two flow carts for determining a boundary from super pixels obtained from the distance map of the distance sensor (based on using a Cartesian Coordinate System. Similar principles apply to other coordinate systems)
Figure 3B:
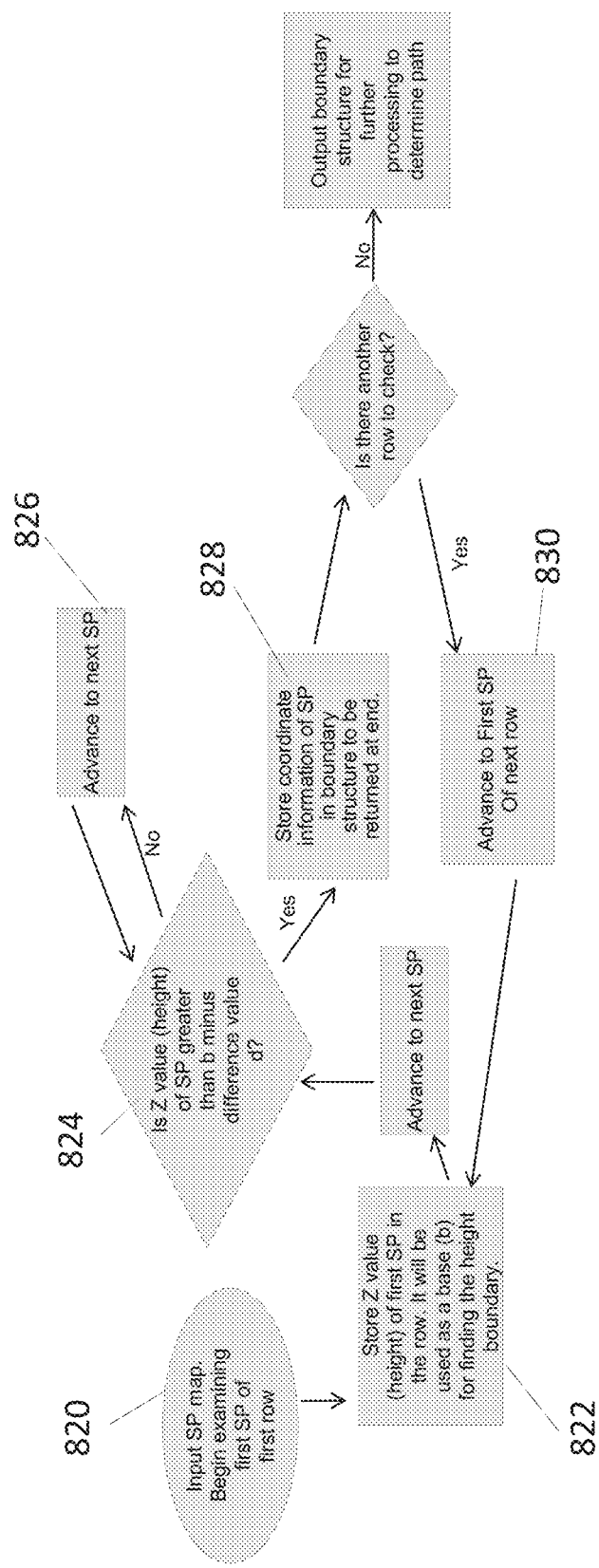

FIGS. 3A and 3B demonstrate examples of processes for determining the boundary by comparing SPs from one row to the next, based on a 3-D Cartesian coordinate system. Preferably, the process starts with a SP on the row closest to the vehicle 102 and at an edge of the area 104 (800 in FIG. 3A or 820 in FIG. 3B). For example, the process compares SPs from right to left in each row, starting with the row closest to vehicle 102 first. Once comparison of the first row is done, comparison of the next row begins, and so on.

In an embodiment, as illustrated in FIG. 3A, the measured, average or weighted heights (Z values) of the SPs are compared to a preselected height h0 (802 in FIG. 3A). When starting the SP scan of a row on the high side of the boundary, if the height is greater (higher off the ground or closer to sensor 100) than the preselected height h0, the SP is considered to be located on the high side 602 of the boundary, and a scan of the next SP in the row is initiated (810 in FIG. 3A). This scanning of sequential SPs in a row continues until the height value of a SP is less than h0 (closer to the ground, further from the sensor 100), at which point the position of the SP is saved as a point on the boundary (806 in FIG. 3A), and the process repeats for the next row (804 and 808 in FIG. 3A), until all rows have been analyzed and the boundary is output to be analyzed for a steering path. The preselected height h0 is selected based on its being an intermediary height between the low side 604 and the high side 602.

In another embodiment, as illustrated in FIG. 3B, the measured, average, or weighted heights of the SPs are compared to an initial read b of the height of the high side 602 (or the low side 604) (822 in FIG. 3B), and a specified difference value d (824 in FIG. 3B). The difference value d is a specified value that is the difference in height from b that indicates the height boundary has been found. The difference value d minimizes false boundary readings. In certain cases, the value of d may be selected as zero if a false boundary is not a concern. In the case of sod harvesting, the specified difference value d is typically on the order of about 0.25 inches to about 1 inch. When starting the SP scan of a row on the high side 602 of the boundary, the height value of the first SP is stored as the initial read value b (822 in FIG. 3B). If the measured, averaged or weighted height is greater than the comparison value b minus d (higher off the ground/closer to sensor 100), the SP is considered to be located on the high side 602 of the boundary, and a scan of the next SP in the row is initiated (826 in FIG. 3B).

The scanning of sequential SPs in a row continues until the height value of a scanned SP is less than b minus d (closer to the ground/further from sensor 100), at which point the position of the SP is saved as a point on the boundary (828 in FIG. 3B). For example, if it is known that the high side is at least 2 inches taller than the low side, a suitable value for d would be 1.5 inches. In this case, the initial scan could start and give b a value of 4 inches above harvested ground level (in this example, 4 inches is used as the starting height based on an example of sod being harvested with a soil depth of 1 inch, and a grass height of approximately 3 inches. The following explanation is simplified by using heights based on the harvested ground level as the Z origin, however in preferred practice, this starting height would actually be a measurement from the sensor 100 down, e.g., 26 inches if the sensor 100 were mounted 30 inches above harvested ground level, and the d value would have to be added to the subsequent reads instead of subtracted, as shorter heights from harvested ground level up translate to greater heights from sensor 100 down.) The scan would continue through the row of SPs until a SP with a height value that is less than 2.5 inches (b−d=4−1.5=2.5) is found; and that SP's position information would be stored as the boundary position for that row. For this example, it is assumed that there were four SPs found after the initial read with height values of 4.2, 3.98, 4.17, and 2.39 inches, respectively. Without specifying the difference value d, the minor drop in height at the second value of 3.98 inches could cause a false boundary to be found. Each row provides a point on the boundary between the high side 602 and the low side 604. Once the boundary position for a row is found, comparison of SPs for the next row in the area 104 is initiated (830 in FIG. 3B). After all rows in the area 104 are analyzed, the boundary points are connected to determine the boundary between the high side 602 and the low side 604.

Alternatively, sensor 100 may be a color detection sensor, such as a digital color camera. With known parameters of the camera, such as resolution, field of view, mounting angle and mounting height, data can be collected to steer the vehicle 102 along a boundary based upon color differences, such as the boundary between harvested sod (soil or dirt) and unharvested sod (grass). The data collection and manipulation are similar to what has been described above with the distance sensor. Instead of looking for a height difference, the system looks for color differences, as grass is typically green and dirt/soil is typically brown/black.

From the color differences from one point to adjacent points, a boundary line and its location may be determined. In some embodiments, the expected target color for one or both sides of the boundary may be provided prior to processing. The expected target color(s) would be chosen based on the color of the grass on the unharvested side (high side) of the line, most likely a shade of green, and/or the color of the dirt on the harvested side (low side) of the line, most likely a shade of brown. In other embodiments, the sensor 100 takes baseline readings on the periphery (lateral bounds of the camera as far away from the expected boundary line as possible) and attempts to guess at one or both of the target colors. While there is no distance information provided by the sensor 100, the field of view, resolution, angle of mounting and height of mounting are used to estimate a pixel's location on the area 104.

For example, for relatively flat ground, as is typically the case for sod harvesting, the 2-dimensional color picture generated by the cameras/sensor 100 may be overlaid onto a Cartesian coordinate system. In the 2-D Cartesian coordinate, it is preferred that the X-axis is perpendicular to the general direction of the vehicle, and the Y-axis is parallel to the general direction of the vehicle, and the X-Y plane parallel to the ground. Under this assumption of flat ground, and using trigonometric formulae in conjunction with the camera's resolution, field of view, mounting angle and mounting height, each pixel may be mapped to a particular coordinate in the Cartesian plane (402 in FIG. 4), which corresponds to real world distances in the area 104.

For example, if a camera 310 has a field of view of +30 degrees to −30 degrees in the X direction and +45 degrees to −45 degrees in the Y direction, a resolution of 60 pixels in the X direction and 90 pixels in the Y direction, a mounting angle of 0° (facing straight down at the ground), and a mounting height of 3 feet, the aforementioned mapping could be done as follows: (a) find X outer limits of approximately 1.732 feet (3*tan 30 degrees), and since the field of view on the X direction is symmetrical, the leftmost X pixel (X=0) would correspond to −1.732 feet from the center, the rightmost X pixel (X=59) would correspond to +1.732 feet from the center; (b) find the spacing between X pixels by dividing the whole X range by one less than the X resolution ((1.732−(−1.732))/(60−1)=3.464/59=approximately 0.0587 feet or approximately 0.7 inches). From the combination of the results of (a) and (b), and the fact that the camera has a mounting angle of 0° (so all results are symmetric), the X location for any pixel can be calculated by the formula −1.732 feet+(0.7 inches*n), where n is the pixel index (0 through 59). The Y location for the pixels may also be similarly calculated as follows: (c) find the Y outer limits of 3 feet (3*tan 45 degrees), and since the field of view on the Y direction is symmetrical, the rear-most Y pixel (Y=0) would correspond to −3 feet from center, the forward-most Y pixel (Y=89) would correspond to +3 feet from center; (d) find the spacing between Y pixels by dividing the whole Y range by one less than the Y resolution ((3−(−3))/(90−1)=6/89=approximately 0.0674 feet or approximately 0.81 inches). From the combination of the results of (c) and (d), and the fact that the camera has a mounting angle of 0° (so all results are symmetric), the Y location for any pixel can be calculated by the formula −3 feet+(0.81 inches*n), where n is the pixel index (0 through 89). Therefore, the pixel (X17, Y54) would translate to X=0.7403 feet (−1.732 feet+(0.7 inches*17)), Y=0.645 feet (−3 feet+(0.81 inches*54)). The color map contains individual pixels, each corresponding to one point 106 in the area 104. Each pixel contains information on the position of the point 106 (e.g. in Cartesian coordinate) and the color of that point 106.

Figure 4:
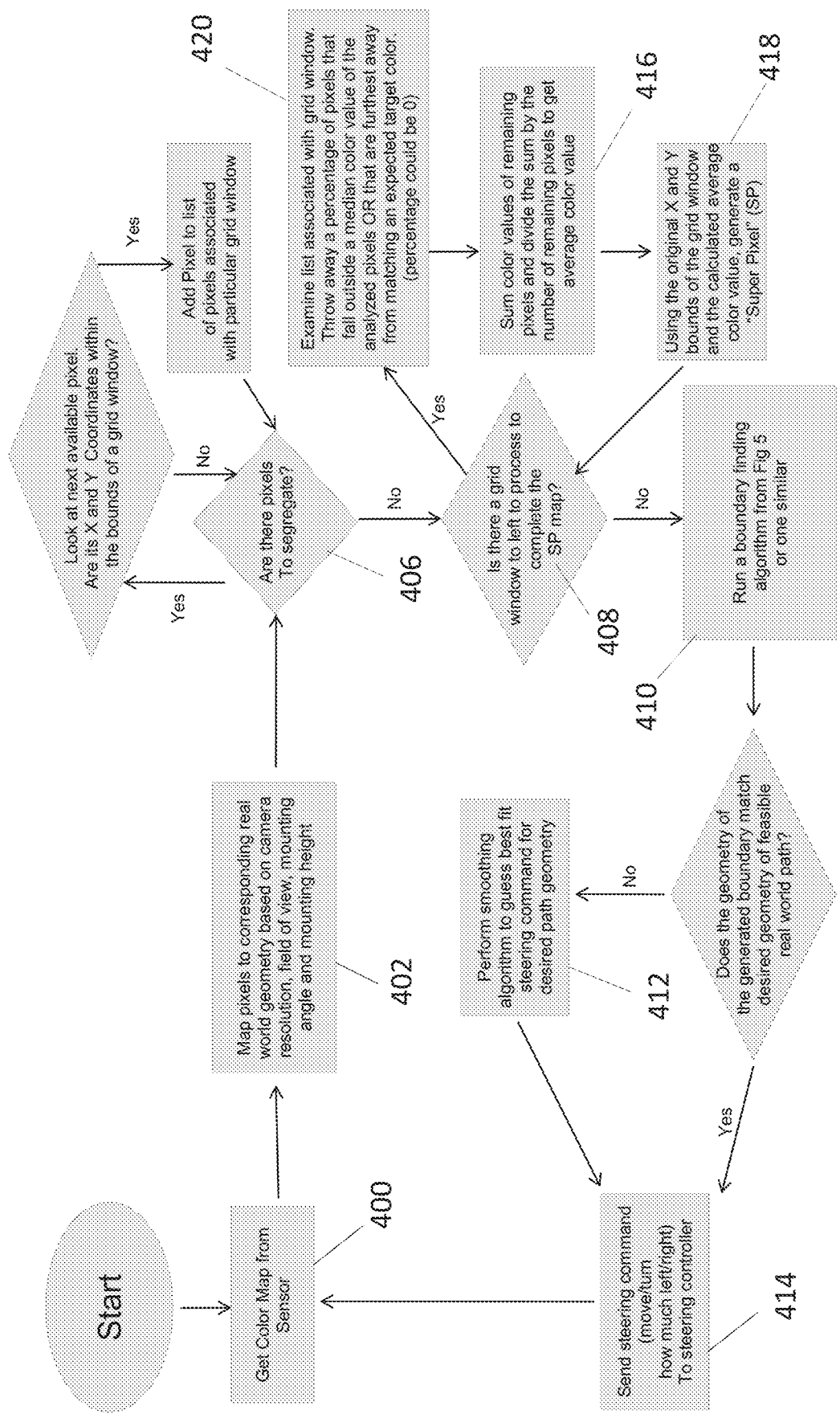
FIG. 4 shows a flow chart for processing and analyzing a color map obtained from the color sensor (based on using a Cartesian Coordinate System)

In certain embodiments, once the color map has been established an averaging method may be used to smooth out the color data (406 and 408 in FIG. 4). Typically, color pixel values are represented as 24 bit hexadecimal values, where the 8 most significant bits represent the Red (R) value, the middle 8 bits represent the Green (G) value, and the least significant 8 bits represent the Blue (B) value. The averaging of color values can be achieved by breaking each pixel into its corresponding Red, Green, and Blue components, respectively summing all the Red, Green, and Blue components of each pixel within the lateral bounds, dividing each summed Red, Green, and Blue component by the number of pixels used to create the sums, and finally reconstituting the resulting averaged Red, Green, and Blue values back into the single averaged 24 bit color value.

Preferably, averaging of the color may be effected for pixels that fall within specified lateral bounds that have predefined X- and Y-dimensions in the area 104 (e.g. a 10 mm by 10 mm region in the X-Y Plane) by summing the color values of all the pixels whose X and Y values fall within the specified lateral bounds, and dividing that sum by the number of pixels used to create that sum (416 in FIG. 4). For example, if examining the region in the area of interest defined by the real word points (X, Y) in millimeters of (20, 50), (20, 60), (30, 50), and (30, 60), and it is found that 45 pixels have X components that are between 20 mm and 30 mm and Y components that are between 50 mm and 60 mm, the color values of those 45 pixels would be broken down into Red, Green, and Blue components, those components summed respectively, the resulting sums would be divided by 45 to get the average Red, Green, and Blue components, and those components would be reconstituted to get the average color of the real world region.

Alternatively, the averaging may take place over a defined number of adjacent pixels, e.g. one hundred (100) adjacent pixels. In that case, color values of the 99 pixels that are closest to a central pixel and the color value of the central pixel are averaged. The averaging produces a SP from smaller neighboring pixels to produce a smoothed color map (408 and 418 in FIG. 4). For example, if using a 10 by 10 pixel block for the region defined by the pixel locations (X, Y) on the color map of (0,0), (0, 10), (10, 0), and (10, 10), the color values of those 100 pixels on that pixel region are broken down into their Red, Green, and Blue components. The components are summed respectively. The resulting sums are divided by 100 to get the average Red, Green, and Blue component values, and those averaged components are reconstituted to get the average color value of the pixel region. In this case, it may also be necessary to define what the real world X and Y limits are for the region based on information from the pixels, since they were not defined prior to processing as they were in the previous example of using a 10 mm by 10 mm real world region. This could be done many ways, but 2 exemplary methods would be to (a) average the X values and Y values (respectively) of the pixels by respectively summing them, then dividing them by 100, to get a single averaged X value and a single averaged Y value for the real world region; or (b) capture the greatest and least X values and Y values, and use those 4 values to define the bounds of the real world region In both cases, the averaging produces a larger pixel, a "Super Pixel" (SP) (418 in FIG. 4), from neighboring pixels to produce a smoothed color map. When using a 2-D Cartesian coordinate system, each SP contains X, Y, and averaged color information, which can be translated to real world positions and colors. The position in the X-Y Plane of the SP may also be averaged or centered based on the lateral bounds of the area selected for averaging. The position and size of each SP are determined based on the resolution of the sensor 100, and the processing power of the integrated processor. A greater number of pixels per SP (which can be proportional to a higher resolution of sensor 100), and also a greater number of SPs, requires more processor power and/or time to analyze/compute. For effective averaging, at least 10 color pixels per SP is preferred, while increasing the number of pixels per SP can achieve more effective averaging and smoother results. The lateral boundary of the area or the adjacent pixels to be averaged may be considered an averaging zone. As with the distance based averaging zones described above, the color based averaging zones may be selected to be right next to each other, have spaces between, or even overlapping, depending on which processing model fits best based on resolution of sensor 100 and processing power of the integrated processor. The rationale for which averaging zone method to use is the same as outlined above for the depth based averaging zones.

By performing pixel averaging over the entire color map, a smoothed color map (a grid or multi-dimensional array) is generated that may contain many fewer pixels than the original color map, but with greater repeatability, due to the averaging within each zone. Averaging allows the system to track a color boundary despite natural color variations that can exist on a surface. These variations may be caused by simple discolorations or by differences in light or shadow. The averaging increases reliability in applications where there can be significant color differences within one or both sides of the boundary that may be ignored. In the application of steering a sod harvester, where at least one side is composed of blades of grass that could have color differences due to disease, fertility, weed encroachment, or even reflectiveness, pixel averaging is useful and increases the accuracy of the sensor 100 by smoothing and eliminating unevenness in the data.

In certain embodiments, the averaging may also be weighted, considering only the top percentage of the read pixels closest (or furthest) in color to the expected target color (i.e., if each averaging zone contains 100 pixels, only looking at the 60 pixels that have color values closest [or furthest] to the expected target color). (420 in FIG. 4) The weighting may be desirable to ensure that any extreme outlying pixels, like those that could result from reading a flowering weed or paint mark that is a very different color from the grass around it, would not adversely affect or skew the results of the averaging. For example, if using an averaging zone of 100 pixels, and a desired weighting of 80% of the closest color values, all the color values from the 100 pixels could be placed on a color wheel, and the 80 pixels (80% of 100) that are closest together would go through the Red, Green, Blue components breakdown, summing, dividing by 80 (number of pixels used), and reconstituting that was discussed earlier, and the remaining 20 pixels (20% of 100) would be ignored, to get the weighted average color value. The smoothed color map is similar to the original color map except that the individual SPs contain information on a larger area than the original pixels.

The smoothed color map may be used to determine the boundary interface between two surfaces of different colors by comparing colors between adjacent SPs. The boundary, in certain embodiments, provides a path to steer the vehicle (410, 412, and 414 in FIG. 4).

FIGS. 5A, 5B, 5C, and 5D demonstrate processes for determining the boundary interface by comparing SPs from one row to the next, based on a 2-D Cartesian coordinate system. Preferably, the process starts with a SP on the row closest to the vehicle 102 and at an edge of the area 104. For example, the process compares SPs from right to left in each row, starting with the row closest to vehicle 102 first. Once the first row is processed, comparison of the next row begins, and so on.

Figure 5A:
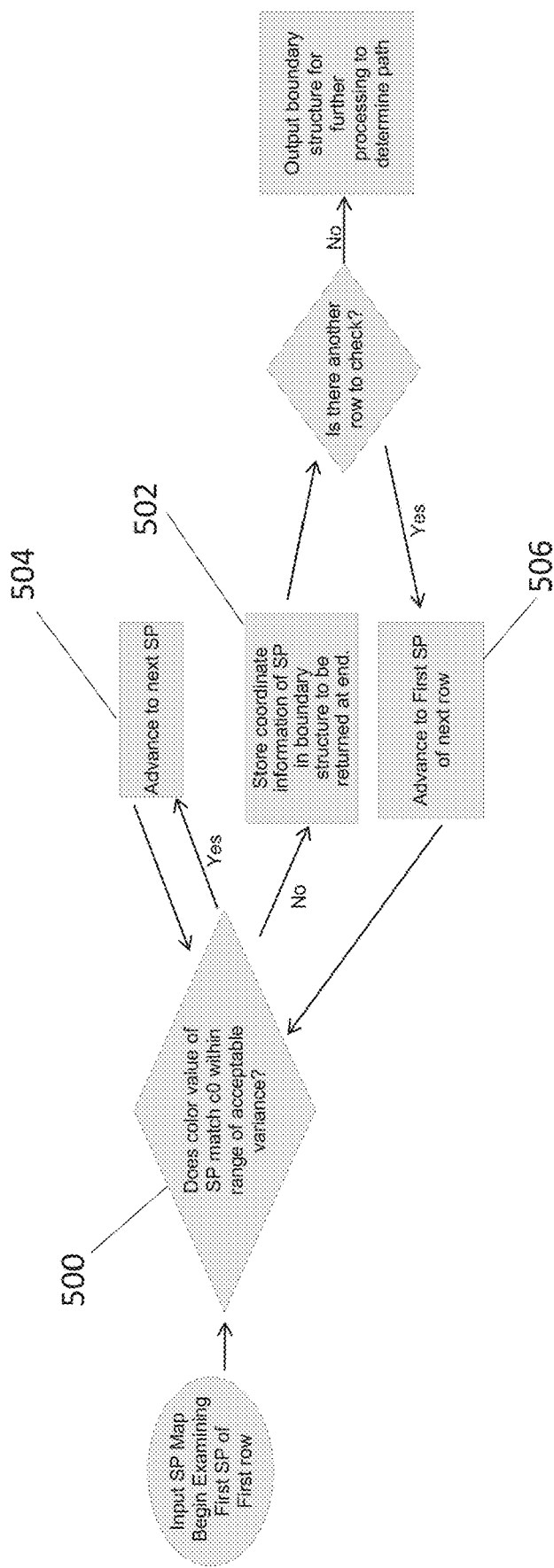
FIGS. 5A, 5B, 5C and 5D show 4 flow charts for determining a boundary from the super pixels obtained from the color map of the color sensor (based on using a Cartesian Coordinate System. Similar principles apply to other coordinate systems)

As illustrated in FIG. 5A, the measured, average, or weighted colors of the SPs are compared to a preselected expected target color c0 (500 in FIG. 5A), which is selected based on the color of the side of the boundary on which the analysis starts, i.e., a shade of green if starting on the grass side. If the measured color does not match the expected target color within a range of acceptable variance, the pixel's position is saved as a point on the boundary (502 in FIG. 5A). If the color matches, then the next SP is interrogated (504 in FIG. 5A). In some cases, a range of acceptable variance for color matching could be zero, looking for an exact color match. In the case of sod harvesting, where there could be color variance as described above, a range of acceptable colors needs to be provided, or a color closeness algorithm may be used, with ranges chosen based on the current conditions of the environment, i.e., how uniform the color of the grass is, or how starkly different in color the grass from the dirt is. The higher the tolerance needed to accommodate variance, the more forgiving the range of acceptable colors and/or the color closeness algorithm needs to be.

An example of a color closeness algorithm would be an algorithm in which the preselected target color is placed on an RGB color wheel, the read pixel color value is placed on that same color wheel, and if they are within a certain predefined acceptable distance of each other a color match is made within the range of acceptable variance. The preselected target color is selected based on the expected median color of one side of the color boundary. Once the boundary position for a row is found, comparison of the SPs for the next row is initiated (506 in FIG. 5A). Each row provides a point on the boundary at the color change, which for sod harvesting would be between the grass (green) side 602 and the dirt (brown) side 604. After all rows are analyzed, the boundary points are connected to determine the boundary interface between the grass (green) side 602 and the dirt (brown) side 604.

Figure 5B:
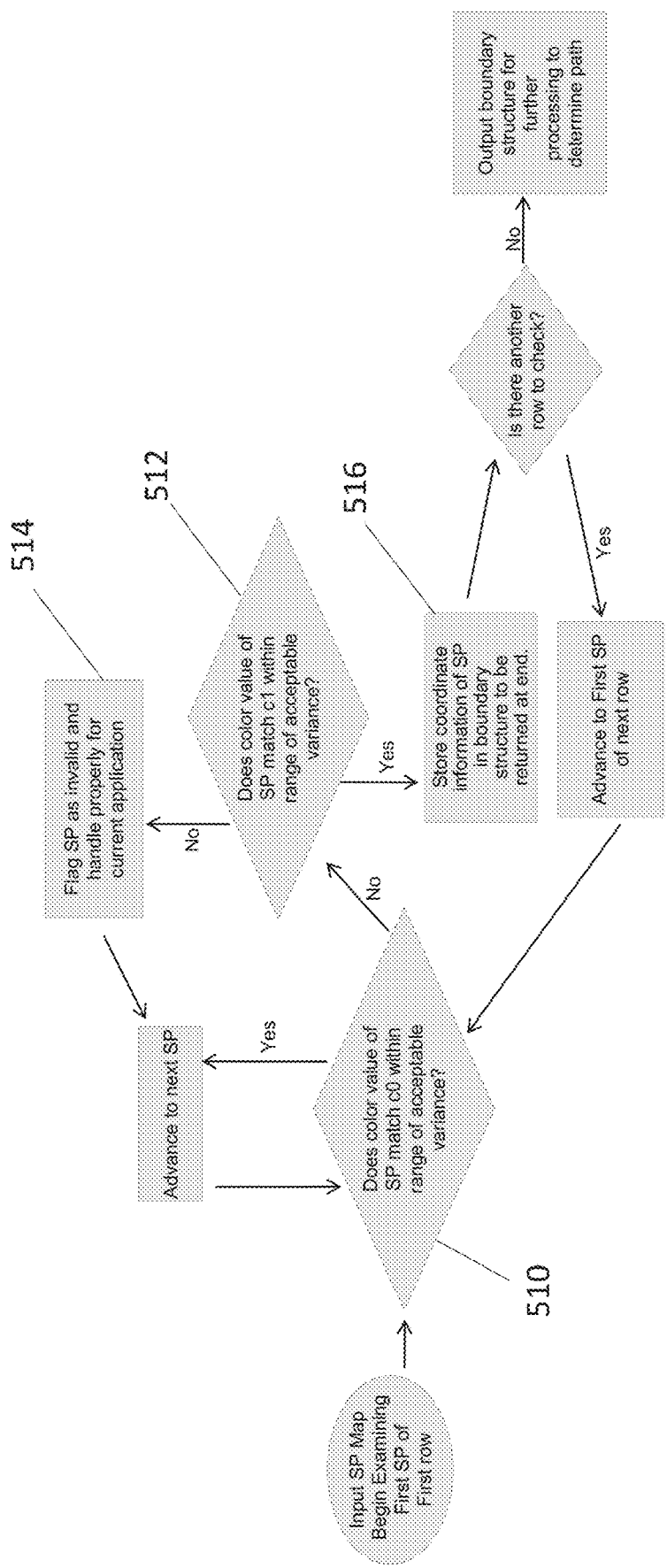

In another embodiment, as illustrated in FIG. 5B, the measured, average, or weighted colors of the SPs are compared to two preselected expected target colors, c0 and c1, one target color for each side of the boundary (510, 512 in FIG. 5B) For harvesting sod, c0 and c1 would be based on the actual color of the harvested side of the line (dirt/soil) which will typically be a shade of brown, and the actual color of the unharvested side (grass) which will typically be a shade of green. If the measured color does not match either of the expected target colors within a range of acceptable variance, the pixel's information is flagged as invalid (514 in FIG. 5B). Invalid pixels may be handled in various ways, including but not limited to being ignored or being given an assumed expected target color based on the color value of the surrounding SPs. Otherwise, if the color matches one of the preselected target colors within the predefined range of acceptable variance, its position is saved, to be used later to find the point at which the color boundary occurs (516 in FIG. 5B).

The dual color approach allows the algorithm to be a bit more robust as it will not be as easily fooled into finding a false boundary. In the example of sod harvesting, it would be expected for one color target to be green and one to be brown/black. However, if the grass had been marked with orange marking paint, it could create a false color boundary at the location of the paint when only looking for the green. With the two-target color approach, the orange could be filtered out, preserving the integrity of the color boundary at the points where green meets brown. After all rows in area 104 are analyzed, the boundary between the grass (green) side 602 and the dirt (brown) side 604 can be determined as noted above for FIG. 5A.

Figure 5C:
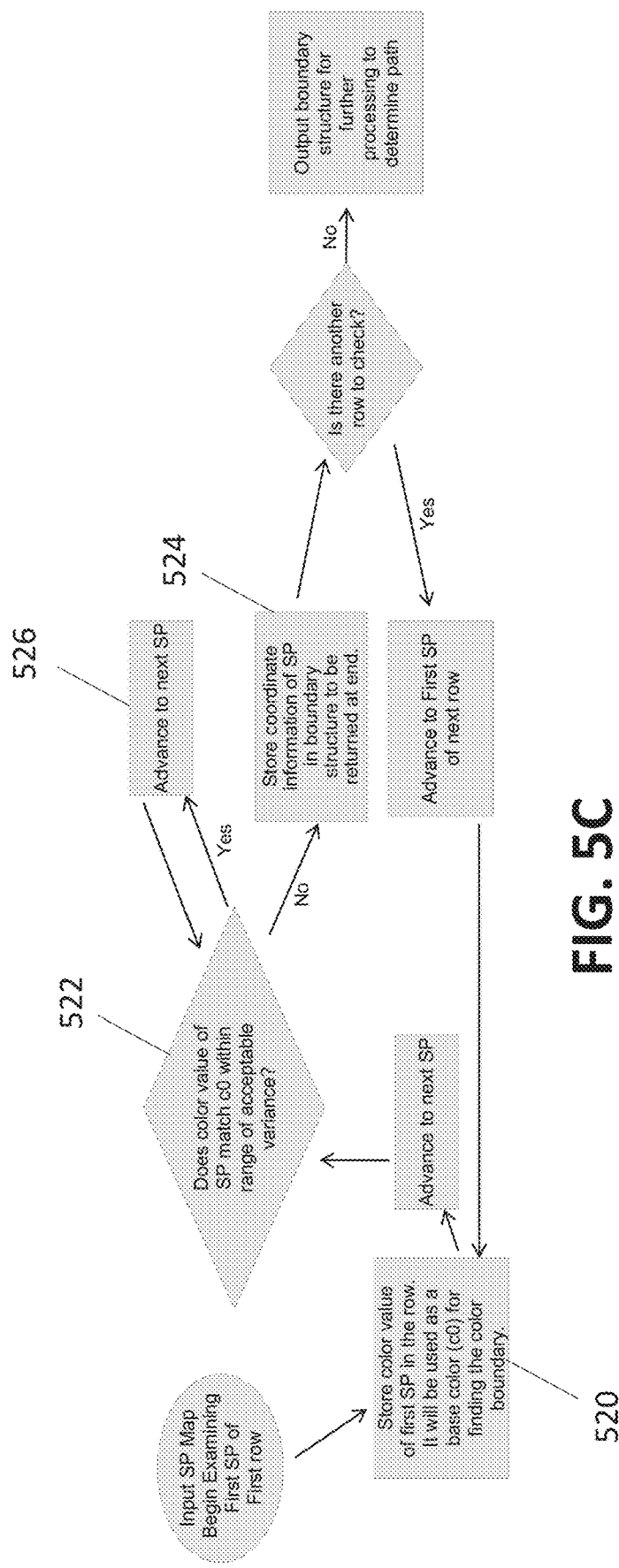

In another embodiment, as illustrated in FIG. 5C, the measured, average, or weighted colors of the SPs are compared to an initial read c0 of the color of one side of the boundary (520 in FIG. 5C). If the measured color does not match the color c0 within a range of acceptable variance (522 in FIG. 5C), the pixel's position is saved as a point on the boundary (524 in FIG. 5C) and analysis of the next row is started. If there is a match, then the next SP in the row is interrogated (526 in FIG. 5C). After all rows are analyzed, the boundary between the grass (green) side 602 and the dirt (brown) side 604 can be determined as noted above for FIG. 5A.

Figure 5D:
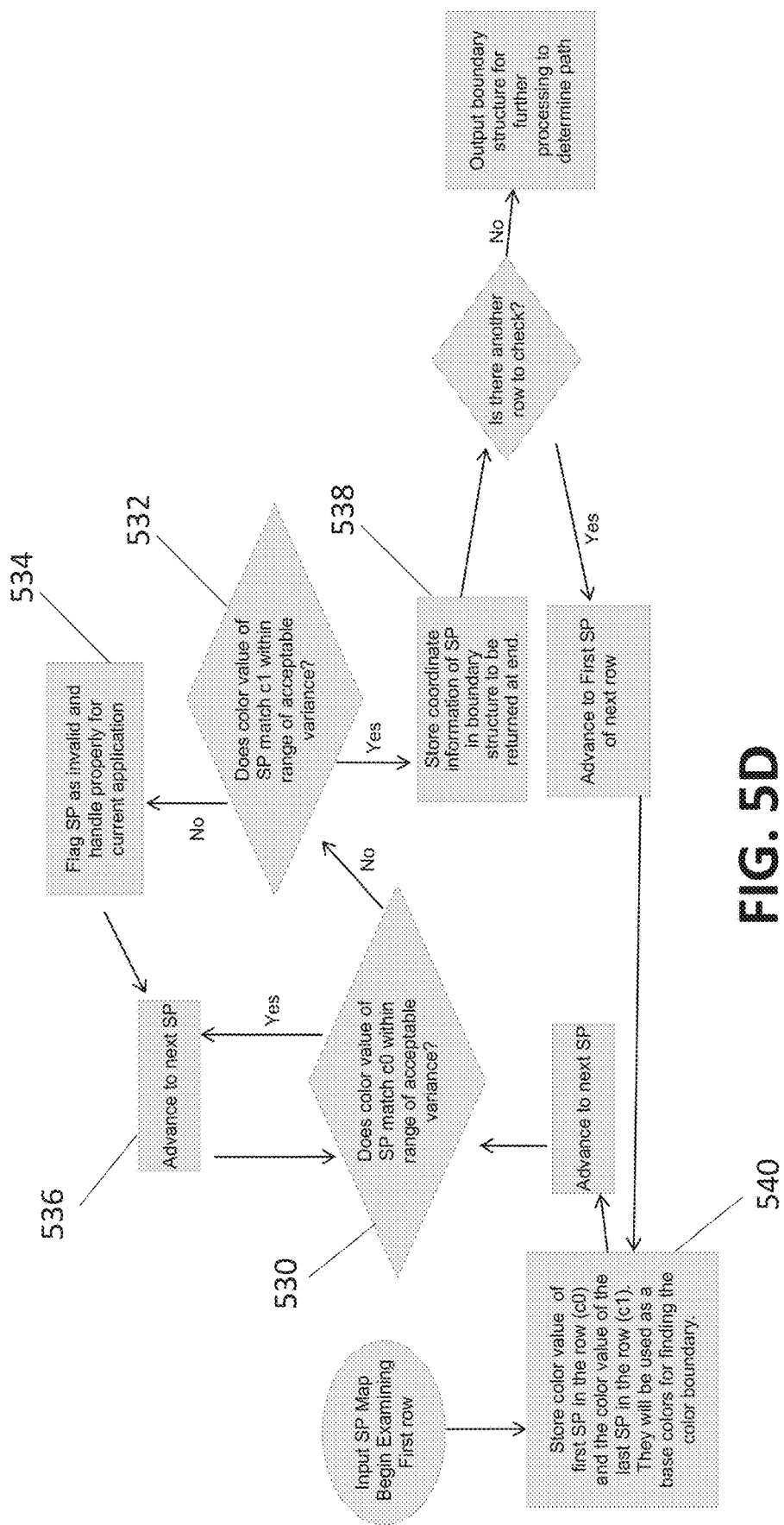

In another embodiment, as illustrated in FIG. 5D, the measured, average, or weighted colors of the SPs are compared to two colors on an initial read, c0 and c1 (540 in FIG. 5D), one target color for each side of the boundary, typically the SP values on the lateral limits on both sides of a row that is generally perpendicular to the boundary. If the measured color does not match either of the expected target colors within a range of acceptable variance (530, 532 in FIG. 5D), the pixel's information is flagged as invalid (534 in FIG. 5D) and the next SP is interrogated (536 in FIG. 5D). If the color matches one of the target colors c0 or c1, its position is saved, to be used later to find the point at which the color boundary occurs (538 in FIG. 5D). The advantages of the dual color approach are mentioned above. After all rows are analyzed, the boundary between the grass (green) side 602 and the dirt (brown) side 604 can be determined as noted above for FIG. 5A.

Alternatively, sensor 100 may be a combination of the distance measuring and color measuring technologies. Using the methods outlined above, the combination sensors would work together to find the best boundary and therefore the best fit steering path by complementing one method's weakness with the other method's strength. For example, some sod goes dormant in the winter and changes to a yellowish brownish color, which could be a very similar color to the dirt/soil, and the color system could have trouble finding the boundary on its own while the depth system would not have an issue. Conversely, there are often puddles on the harvesting line, some may be longer than the recommended 5 feet of length for the area of interest, that almost cover the grass, essentially erasing the height boundary as the top of the puddle has no significant height difference between the harvested side of the boundary and the unharvested side of the boundary. However, the green from the grass and the brown from the dirt are still visible, and the color detection system would not have an issue determining the boundary. Additionally, having both systems running simultaneously gives more data points for analysis, and as long as processing power permits, more data points tend to lead to more accurate results.

As shown in FIG. 6, once all of the SPs (distance, color, or a combination of both) are analyzed, a determined boundary 608 is found that reflects the real-world boundary 600 between the side 602 (high side, green/yellow side, or combination of both) and the side 604 (low side, brown/black side, or combination of both). The boundary interface 600 may be too tortuous to effectively steer a sod harvester 102 precisely along that boundary 600, however. In that case, it may be beneficial to use the determined boundary 608 as a guide to smooth out the boundary into a less tortuous path (212 in FIG. 2 and 412 in FIG. 4). In the case of sod harvesting, while the smoothing out process may generate more waste at the start by leaving ribbons and/or cutting skinny slabs, the eventual straightening of the harvesting line will create an easier path to follow and ultimately lead to a relatively straighter harvest line producing less waste pass after pass.

In an exemplary embodiment, as shown in FIG. 6, the smoothed path 606 may be a linear best fit of the real word boundary 600. Although linear best fit is shown in FIG. 6, other best fits are also appropriate for the present invention, such as curves, zigzags, etc., to simplify the steering of the harvester 102. Once the smoothed path is determined, the harvester 102 may be steered to follow that smoothed path. As the harvester 102 moves forward, the sensor 100 (and associated processor) continually updates and calculates the boundary and associated path in the area 104 forward of the harvester's direction of travel.

In an embodiment, the sensor 100, e.g. distance sensor, may be integrated with a computer to provide a system for processing the distances obtained by the sensor 100 and controlling and steering the harvester 102 along the boundary. The computer preferably contains software or software modules for rotating and/or transforming the coordinate system, averaging the pixels to obtain SPs, determining the boundary, and smoothing the boundary to generate a viable path of travel. The computer may also be in communication with controllers for sending guidance signals to the onboard harvester controller for steering the harvester 102 along the boundary. Other equipment, including gyroscopes, accelerometers, compass, odometers, guidance wires, RF signals, cell phone signals, Wi-Fi signals, GPS, etc., may also be in communication with the computer, e.g., to determine the vehicle's orientation and/or location.

In an embodiment, the sensor 100, e.g. color sensor, may be integrated with a computer to provide a system for processing the colors of the pixels and positions associated with the corresponding pixels obtained by the sensor and controlling and steering the vehicle along the boundary. The computer preferably contains software or software modules for averaging the pixels to obtain SPs, mapping color pixels to real world locations, determining the boundary, and smoothing the boundary to generate a viable path of travel. The computer may also be in communication with controllers for sending guidance signals to the onboard harvester controller for steering the harvester along the boundary. Other equipment, including gyroscopes, accelerometers, compass, odometers, guidance wires, RF signals, cell phone signals, Wi-Fi signals, GPS, etc., may also be in communication with the computer, e.g., to determine the vehicle orientation and/or location.

In an embodiment, the sensor 100, e.g. combined color sensor and distance sensor, of the present invention may be integrated with a computer to provide a system for processing the colors of the pixels and positions associated with the corresponding pixels obtained by the color sensor, for processing the distances obtained by the distance sensor, integrating the information from the two different sensors, and controlling and steering the vehicle along the boundary. The computer preferably contains software or software modules for averaging the color pixels to obtain color SPs, mapping color pixels to real world locations, rotating and/or transforming the coordinate system of distance pixels, averaging the distance pixels to obtain distance SPs, determining the boundary, and smoothing the boundary to generate a viable path of travel. The computer may also be in communication with controllers for sending guidance signals to the onboard harvester controller for steering the harvester along the boundary. Other equipment, including gyroscopes, accelerometers, compass, odometers, guidance wires, RF signals, cell phone signals, Wi-Fi signals, GPS, etc., may also be in communication with the computer, e.g., to determine the vehicle orientation and/or location.

In an embodiment, the sensor 100 and system of the present invention may be used to guide or steer a sod harvesting machine 102. The system is mounted on the sod harvesting vehicle 102 to detect the boundary interface between the harvested and unharvested grass. As detected by the system, the harvested side is the low side 604 and/or the brown/black side while the unharvested side is the high side 602 and/or the green side. The system sends signals to the harvester's automated controller to guide the harvester 102 along the boundary between the harvested and unharvested side. The system may also include one or more navigational equipment systems to provide a more robust guidance for the harvester.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. The specification describes specific examples to accomplish a more general goal that may be accomplished in another way.

What is claimed is:

1. A system for sod harvesting, comprising
   a. a sod harvester;
   b. a sensor mounted to the sod harvester and configured to image an area of the ground in front of the sod harvester; and
   c. a processor operably associated with and configured to receive image information from the sensor, to determine, from the image information, a harvesting line boundary in the area, and to steer the sod harvester along the harvesting line boundary, wherein the processor is configured to determine the harvesting line boundary by generating a map comprising an array of pixels, and scanning the array of pixels to determine the harvesting line boundary.

2. The system of claim 1, wherein the sensor comprises a plurality of spaced cameras and a processor operably associated with the cameras and configured to periodically capture images from the cameras.

3. The system of claim 2, wherein the cameras are each an infrared camera.

4. The system of claim 1, wherein the sensor is a distance sensor and/or a color sensor.

5. The system of claim 4, wherein the distance sensor is an infrared sensor, an ultrasonic sensor, a microwave sensor, a radar sensor, capacitance sensor, a laser sensor, a stereo vision sensor, or combinations thereof.

6. The system of claim 4, wherein the color sensor is a CCD camera and/or a CMOS camera.

7. The system of claim 1, wherein each pixel corresponds to a location in the area and comprises information for the location and
   a. a height at that location based on the distance from the sensor to the ground at that location, used for generating a distance map, or
   b. a color at that location, used for generating a color map.

8. The system of claim 7, wherein the location is mapped in a Cartesian coordinate system.

9. The system of claim 1, wherein adjacent pixels are averaged to provide a super pixel before scanning for the height boundary.

10. A method for operating a sod harvester, the method comprising the steps of:
    a. providing the system of claim 1;
    b. mapping an area in front of the sod harvester;
    c. determining the harvesting line boundary in the area; and
    d. steering the sod harvester along the harvesting line boundary.

11. A system for sod harvesting, comprising
    a. a sod harvester;
    b. a sensor mounted to the sod harvester and configured to image an area of the ground in front of the sod harvester; and
    c. a processor operably associated with and configured to receive image information from the sensor, to determine, from the image information, a harvesting line boundary in the area, and to steer the sod harvester along the harvesting line boundary, wherein the image information is a distance map, where each pixel contains location and height information based on distance from the sensor, and/or the image information is a color map, where each pixel contains location and color information of the location.

12. The system of claim 11, wherein the distance map comprises an array of pixels, each pixel is mapped to a location in the area and comprises the location and a height at the location.

13. The system of claim 12, wherein the processor is configured to compare the heights for adjacent pixels.

14. The system of claim 12, wherein the processor is configured to average heights of adjacent pixels to provide a super pixel.

15. The system of claim 12, wherein the processor is configured to provide an array of super pixels, and to compare the heights for adjacent super pixels.

16. The system of claim 11, wherein the color map comprises an array of pixels, each pixel is mapped to a location in the area and comprises the location and the color at that location.

17. The system of claim 16, wherein the processor is configured to compare the colors for adjacent pixels.

18. The system of claim 16, wherein the processor is configured to average colors of adjacent pixels to provide a super pixel.

19. The system of claim 16, wherein the processor is configured to provide an array of super pixels, and to compare the colors for adjacent super pixels.

20. The system of claim 11, wherein the sensor comprises a plurality of spaced cameras and a processor operably associated with the cameras and configured to capture images from the cameras.

21. The system of claim 11, wherein the sensor is a distance sensor and/or a color sensor.

* * * * *